(12) United States Patent
Hemenway et al.

(10) Patent No.: US 6,771,852 B2
(45) Date of Patent: Aug. 3, 2004

(54) TWO-FIBER OPTICAL SHARED PROTECTION RING WITH A BI-DIRECTIONAL 4×4 OPTICAL SWITCH FABRIC

(75) Inventors: Roe Hemenway, Painted Post, NY (US); Izudin Lelic, Plymouth, MN (US); Ming-Jun Li, Horseheads, NY (US); Mark J. Soulliere, Corning, NY (US); Daniel J. Tebben, Ipswich, OK (US); Xuxing Zhao, Ann Arbor, MI (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/117,598

(22) Filed: Apr. 5, 2002

(65) Prior Publication Data

US 2003/0128978 A1 Jul. 10, 2003

Related U.S. Application Data

(60) Provisional application No. 60/281,979, filed on Apr. 6, 2001.

(51) Int. Cl.[7] .......................... G02B 6/28; H04B 10/08
(52) U.S. Cl. .......................... 385/24; 385/17; 398/4; 398/7
(58) Field of Search .................. 385/15–24; 398/3–5, 398/7, 34, 43, 45, 48–51, 58–60, 140, 141; 359/115, 118, 119, 124–134, 154, 164, 165

(56) References Cited

U.S. PATENT DOCUMENTS 6,023,359 A * 2/2000 Asahi ........................... 398/5
6,195,186 B1 * 2/2001 Asahi ........................... 398/5
6,222,653 B1 * 4/2001 Asahi ........................... 398/4
6,249,510 B1   6/2001 Thompson
6,304,347 B1 * 10/2001 Beine et al. ................. 398/38
6,414,765 B1   7/2002 Li et al.
6,579,018 B1 * 6/2003 Li et al. ....................... 398/4
6,583,900 B2 * 6/2003 Onaka et al. ................ 398/59
6,587,235 B1 * 7/2003 Chaudhuri et al. ......... 370/216
6,616,350 B1 * 9/2003 de Boer et al. ............... 398/9

* cited by examiner

Primary Examiner—Akm Enayet Ullah
Assistant Examiner—Michelle R. Connelly-Cushwa
(74) Attorney, Agent, or Firm—Gregory V. Bean

(57) ABSTRACT

The present invention is directed to a protection switch for use in a node of a two-fiber optical shared protection ring. The two-fiber optical shared protection ring propagates at least one bi-directional channel. Each bi-directional channel includes a working first wavelength signal and a working second wavelength signal. One fiber in the two-fiber optical channel shared protection ring propagates the working first wavelength signal in a first direction and the other fiber in the two-fiber optical channel shared protection ring propagating the working second wavelength signal in a second direction opposite the first direction. The switch includes an N×N optical switch fabric system disposed in the node. The N×N optical switch fabric includes 2N input/output (I/O) ports, wherein N is four, or an integer multiple of four. Each optical switch fabric is configured to switch at least one bi-directional channel. At least N three-port optical devices are coupled to N of the I/O ports. Each three-port optical device includes a bi-directional port coupled to an I/O port. The bi-directional port is configured to propagate the at least one bi-directional channel.

42 Claims, 27 Drawing Sheets

TWO-FIBER OPTICAL SHARED PROTECTION RING WITH A BI-DIRECTIONAL 4×4 OPTICAL SWITCH FABRIC

CROSS-REFERENCE TO RELATED APPLICATIONS

This application claims priority under 35 U.S.C. §119(e) based on U.S. Provisional Patent Application Serial No. 60/281,979, filed Apr. 6, 2001, the contents of which are relied upon and incorporated herein by reference in their entirety.

BACKGROUND OF THE INVENTION

1. Field of the Invention

The present invention relates generally to optical switching, and particularly to protection switching in a two-fiber optical channel shared protection ring.

2. Technical Background

In many areas of the telecommunications network, fiber optic systems have displaced electrical transport systems because light propagating in optical fibers can carry more information, over longer distances. Optical fiber is also an ideal transmission medium because it is characterized by low transmission losses, low interference, and potentially high bandwidth. However, in many fiber optic systems, most of the switching is still being performed in the electrical domain. In order to take full advantage of the high bandwidth of fiber optic systems, switching functionality has begun to migrate from the electrical layer to the optical layer. At the same time, optical network architectures are becoming increasingly complex. Early architectures were mere point-to-point links. Presently, network designers are considering both optical protection rings, and interconnected optical protection rings.

Optical protection ring topologies are currently being deployed by network providers because of their cost savings, survivability, and ability to self-heal. Ring topologies typically include a plurality of client access nodes that are interconnected by at least two optical fibers to form a ring. Traffic is transmitted from node to node around the ring. Optical protection rings can survive and self-heal from ring fault conditions by providing duplicate and geographically diverse paths for all of the client traffic propagating on the ring. In a two-fiber ring, this is accomplished by providing two fibers that carry working traffic in opposite directions. Each fiber reserves approximately half of its bandwidth for protection purposes. Thus, if a cable is cut between two nodes, or if a wavelength channel transmitter becomes disabled at a particular node, or if there is a switch fabric failure, the ring will detect the fault condition, and route traffic around the damaged network component using the protection bandwidth until a repair can be effected.

Optical shared protection rings are designed to perform protection switching in the optical layer. Protection switching in the optical layer is desirable because it enables the protection mechanism to operate independently of the bit-rate and format of the optical channel. Each channel in a conventional two-fiber bi-directional optical channel shared protection ring has two associated wavelengths. One wavelength propagates in a clock-wise direction in one fiber. The other wavelength propagates in a counter-clock-wise direction in the other fiber. Each wavelength is typically switched using two separate uni-directional switches disposed in each node. What is needed is an optical protection switch that accommodates each wavelength signal in a bi-directional channel to thereby replace the two uni-directional switches used in the conventional system.

SUMMARY OF THE INVENTION

The present invention is directed to a bi-directional optical protection switch that replaces the two uni-directional switches used in the conventional system described above. For every channel in a protection ring, if a node adds traffic from one wavelength, it must drop traffic on the other wavelength return path. This symmetry causes the states of the two uni-directional switches in the conventional design to be mirrors of each other. The present invention takes advantage of this fixed relationship and by replacing the conventional uni-directional pair of switches with one bi-directional switch.

One aspect of the present invention is directed to a protection switch for use in a node of a two-fiber optical shared protection ring. The two-fiber optical shared protection ring propagates at least one bi-directional channel. Each bi-directional channel includes a working first wavelength signal and a working second wavelength signal. One fiber in the two-fiber optical channel shared protection ring propagates the working first wavelength signal in a first direction and the other fiber in the two-fiber optical channel shared protection ring propagating the working second wavelength signal in a second direction opposite the first direction. The switch includes an N×N optical switch fabric system disposed in the node. The N×N optical switch fabric includes 2N input/output (I/O) ports, wherein N is four, or an integer multiple of four. Each optical switch fabric is configured to switch at least one bi-directional channel. At least N three-port optical devices are coupled to N of the I/O ports. Each three-port optical device includes a bi-directional port coupled to an I/O port. The bi-directional port is configured to propagate the at least one bi-directional channel. In another aspect, the present invention includes a two-fiber optical channel shared protection ring. The two-fiber optical shared protection ring propagates at least one bi-directional channel. Each bi-directional channel includes a working first wavelength signal and a working second wavelength signal. One fiber in the two-fiber optical channel shared protection ring propagates the working first wavelength signal in a first direction and the other fiber in the two-fiber optical channel shared protection ring propagating the working second wavelength signal in a second direction opposite the first direction. The protection ring includes a monitor coupled to the two-fiber optical channel shared protection ring. The monitor is configured to detect at least one fault condition in the two-fiber optical channel shared protection ring. A plurality of switching nodes are interconnected by the two-fiber optical channel shared protection ring. Each switching node is responsive to the monitor. Each switching node includes an N×N optical switch fabric system disposed in the node. The N×N optical switch fabric includes 2N input/output (I/O) ports, wherein N is four, or an integer multiple of four. Each optical switch fabric is configured to switch at least one bi-directional channel. At least N three-port optical devices are coupled to N of the I/O ports. Each three-port optical device includes a bi-directional port coupled to an I/O port. The bi-directional port is configured to propagate the at least one bi-directional channel. At least one client add port is coupled to the input port, and at least one drop port is coupled to the output port.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 2:
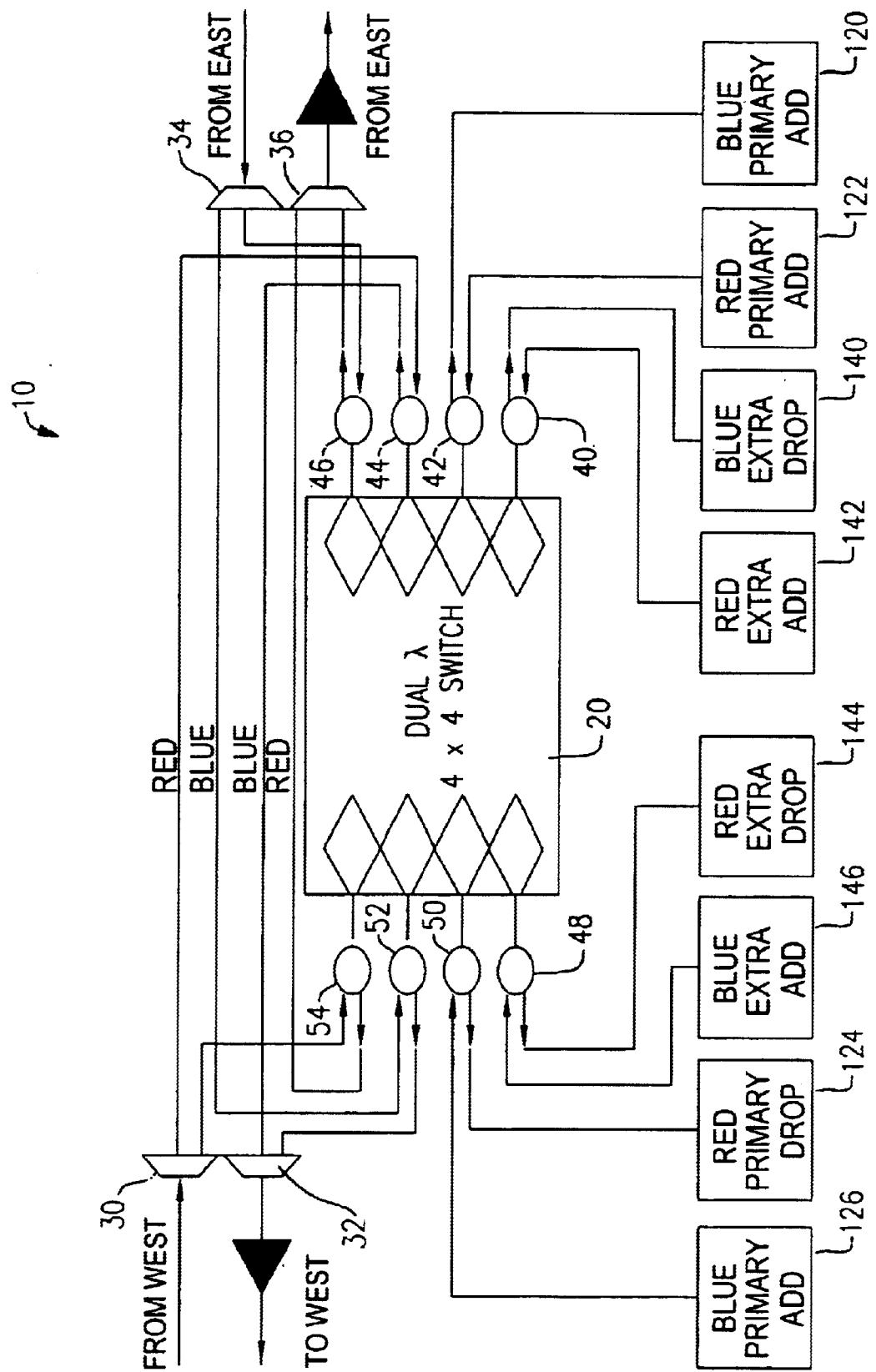
FIG. 2 is a block diagram of a protection switch used in the nodes of the two-fiber optical shared protection ring shown in FIG. 1.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the protection switch of the present invention is shown in FIG. 2, and is designated generally throughout by reference numeral 10.

In accordance with the invention, the present invention is directed to a protection switch for use in a node of a two-fiber optical shared protection ring. The two-fiber optical shared protection ring propagates at least one bi-directional channel. Each bi-directional channel includes a working first wavelength signal and a working second wavelength signal. One fiber in the two-fiber optical channel shared protection ring propagates the working first wavelength signal in a first direction and the other fiber in the two-fiber optical channel shared protection ring propagating the working second wavelength signal in a second direction opposite the first direction. The switch includes an N×N optical switch fabric system disposed in the node. The N×N optical switch fabric includes 2N input/output (I/O) ports, wherein N is four, or an integer multiple of four. Each optical switch fabric is configured to switch at least one bi-directional channel. At least N three-port optical devices are coupled to N of the I/O ports. Each three-port optical device includes a bi-directional port coupled to an I/O port. The bi-directional port is configured to propagate the at least one bi-directional channel.

Figure 1:
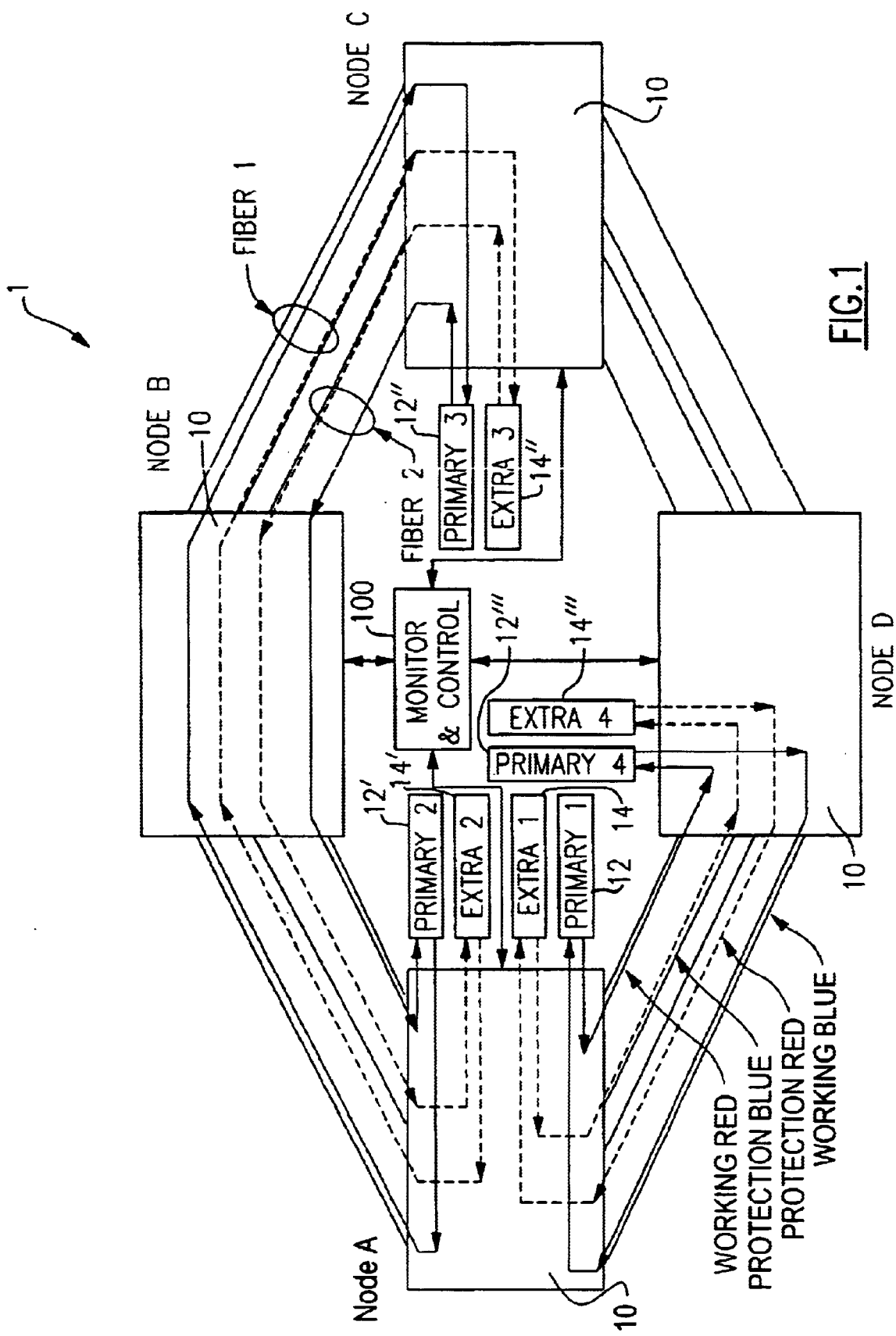
FIG. 1 is a block diagram of the two-fiber optical channel shared protection ring of the present invention under normal conditions.

As embodied herein, and depicted in FIG. 1, a block diagram of the two-fiber optical channel shared protection ring of the present invention under normal conditions is disclosed. As embodied herein, and depicted in FIG. 1, a block diagram of two-fiber optical channel shared protection ring 1 according to the present invention is disclosed. Shared protection ring 1 may include any number of nodes, but there is shown by way of example, Node A, Node B, Node C, and Node D interconnected by fiber 1 and fiber 2. A protection switch 10 is disposed in each node. In one embodiment fiber 1 propagates working wavelengths $\lambda_1$, $\lambda_3$, ... $\lambda_M$, and protection wavelengths $\lambda_2$, $\lambda_4$ ... $\lambda_N$ in counter-clockwise direction. Fiber 2 propagates working wavelengths $\lambda_2$, $\lambda_4$, ... $\lambda_N$, and protection wavelengths $\lambda_1$, $\lambda_3$ ... $\lambda_M$ in a clockwise direction. Those of ordinary skill in the art will recognize that other DWDM schemes may be used as well. For example, fiber 1 may propagate working wavelengths $\lambda_1$, $\lambda_2$, ... $\lambda_M$, and protection wavelengths $\lambda_{M+1}$, $\lambda_{M+2}$ ... $\lambda_N$ in a counter-clockwise direction, whereas fiber 2 propagates working wavelengths $\lambda_{M+1}$, $\lambda_{M+2}$ ... $\lambda_N$, and protection wavelengths $\lambda_1, \lambda_2, \ldots \lambda_M$ in a clockwise direction. Those of ordinary skill in the art will recognize that two-fiber optical shared protection ring 1 may support up to 80 wavelengths.

Referring to FIG. 1, the two-fiber optical shared protection ring 1 is configured to propagate bi-directional channels. A bi-directional channel is defined as including one working wavelength signal propagating in fiber 1 and another working wavelength signal propagating in fiber 2. The protection wavelength signals are paired off in a similar way. To illustrate the above described arrangement, FIG. 1 shows a simplified example of a bi-directional channel. Primary client 1 (Node A) transmits primary traffic to primary client 4 (Node D) using the red working wavelength signal propagating in fiber 2. The primary traffic traverses the return path using the blue working wavelength signal propagating in fiber 1. Under normal conditions, extra traffic may be supported. For example, extra client 1 (Node 1) may transmit extra traffic to extra client 4 (Node D) via protection blue wavelength propagating on fiber 2. The return path is via protection red wavelength propagating on fiber 1. When a protection ring fault condition is detected by monitor and control facility 100, the extra traffic may be pre-empted such that primary traffic is carried by the protection wavelength signals. In the following description, only one bi-directional channel will be shown for clarity of illustration.

As embodied herein and depicted in FIG. 2, a block diagram of protection switch 10 shown in FIG. 1 is disclosed. Protection switch 10 includes 4×4 bi-directional switch fabric 20. 4×4 bi-directional switch fabric 20 includes eight-I/O ports 200, 202, ... 214, which are coupled to three-port optical devices 40, 42, ... 54, respectively. Each three-port device (40 ... 54) includes a bi-directional port coupled to one of the I/O ports (200 ... 214), an input port, and an output port.

Three-port devices 40, 42, 48, and 50 are used to couple switch fabric 20 with client add/drop ports. Three-port device 40 includes an input port coupled to red wavelength extra client add port 142 and an output port coupled to blue wavelength extra client drop port 140. Three-port device 42 includes an input port coupled to red wavelength primary client add port 122 and an output port coupled to blue wavelength primary client drop port 120. Three-port device 48 includes an input port coupled to blue wavelength extra client add port 146, and an output port coupled to red wavelength extra client drop port 144. Three-port device 50 includes an input port coupled to blue wavelength primary client add port 126, and an output port coupled to red wavelength primary client drop port 124.

Three-port devices 44, 46, 52, and 54 are used to couple switch fabric 20 with protection ring 1. Three-port device 44 includes an input coupled to demultiplexer 30, and an output coupled to multiplexer 32. The input port receives protection red wavelength signal from the west, and the output port provides protection blue wavelength signal to the west. Three-port device 46 includes an input coupled to demultiplexer 34, and an output coupled to multiplexer 36. The input port receives working red wavelength signal from the east, and the output port provides working blue wavelength signal to the east. Three-port device 52 includes an input coupled to demultiplexer 34, and an output coupled to multiplexer 32. The input port receives protection blue wavelength signal from the east, and the output port provides working red wavelength signal to the west. Three-port device 54 includes an input coupled to demultiplexer 30, and an output coupled to multiplexer 36. The input port receives working blue wavelength signal from the west, and the output port provides protection red wavelength signal to the east.

As shown, 4×4 bi-directional switch fabric 20 is configured to switch one bi-directional channel. Those of ordinary skill in the art will recognize that a plurality of 4×4 bi-directional switch fabrics 20 can be disposed in a node to create an N×N optical switch fabric system. The N×N optical switch fabric includes 2N input/output (I/O) ports. Each 4×4 bi-directional switch fabric 20 in the N×N system is configured to switch a bi-directional channel, wherein N is four, or an integer multiple of four.

It will be apparent to those of ordinary skill in the pertinent art that switching fabric 20 may be of any suitable type, depending on the cost and the technology used to implement switch 20. In one embodiment, 4×4 switching fabric 20 is implemented using a thermooptic silica type switch fabric. In one four node ring, a 4×4 thermooptic silica type switch fabric provided a protection time of under 7 ms. The revert-to-normal time was approximately 1.2 ms.

In another embodiment, a 4×4 matrix of interconnected Mach-Zehnder switching units is employed. The Mach-Zehnder switching fabric is commonly referred to as a space-division switch, wherein a light signal can be directed from any input port into any output port. A Mach-Zehnder switching fabric is desirable because it is characterized by path-independent loss characteristics. In one embodiment of the Mach-Zehnder switch, each switching unit includes a two-stage dilated Mach-Zehnder design that is individually actuatable. Each two-stage Mach-Zehnder switching unit employs two 1×2 Mach-Zehnder switches operating in tandem. It will be apparent to those of ordinary skill in the pertinent art that modifications and variations can be made to the Mach-Zehnder switch fabric depending on the type of actuation used. For example, the switching units can be actuated using thermooptic, piezoelectric, or electrooptic actuators. Reference is made to U.S. patent application Ser. No. 09/630,550, which is incorporated herein by reference as though fully set forth in its entirety, for a more detailed explanation of a Mach-Zehnder switching fabric.

In another embodiment, switching fabric 20 is implemented using an N×N MEMS movable mirror switch fabric. A MEMS switching fabric is operative to direct a light signal from any one of N inputs to any one of N outputs. A MEMS switch fabric is implemented by disposing a matrix of waveguides in a silica substrate. Other substrate materials may be used as well. Trenches are formed at the cross-points of the matrix. A movable switching element is disposed in each trench. In one embodiment, each switching element includes a sliding MEMS mirror, a mirror anchor, and a MEMS actuator to slide the MEMS mirror into and out of the cross-point in accordance with the switch state. It will be apparent to those of ordinary skill in the pertinent art that modifications and variations can be made to a MEMS movable mirror switch fabric depending on the fabrication techniques employed. For example, the switching elements may be deployed on a second substrate and mated to the waveguide substrate. Index-matching fluid may be disposed in the trenches to maintain beam collimation as a light signal propagates through the cross-points. Further, MEMS switch fabric 20 may be implemented as a free-space design, as opposed to the guided wave approach discussed above. Reference is made to U.S. patent application Ser. Nos. 09/421,765, 09/473,670, 09/520,054, 09/675,331, which are incorporated herein by reference as though fully set forth in its entirety, for a more detailed explanation of a MEMS switching fabric.

In yet another embodiment, switch fabric 20 may be implemented using a polarization modulating switch. Reference is made to U.S. Pat. No. 6,285,500, U.S. patent application Ser. Nos. 09/948,380, 09/901,382, and 09/429,135, which are incorporated herein by reference as though fully set forth in its entirety, for a more detailed explanation of WSS 20.

It will be apparent to those of ordinary skill in the pertinent art that demultiplexer 30, multiplexer 32, demultiplexer 34, and multiplexer 36 may be of any suitable type, but by way of example, these devices may be implemented using diffraction gratings or prism based systems.

It will be apparent to those of ordinary skill in the pertinent art that three-port optical devices (40, . . . , 54) may be of any suitable type including an optical interleaver device or an optical circulator. Each of these devices includes a bi-directional input supporting both wavelength signals in the bi-directional channel, an input port for receiving one of the wavelength signals, and an output for propagating the other wavelength signal.

Figure 3:
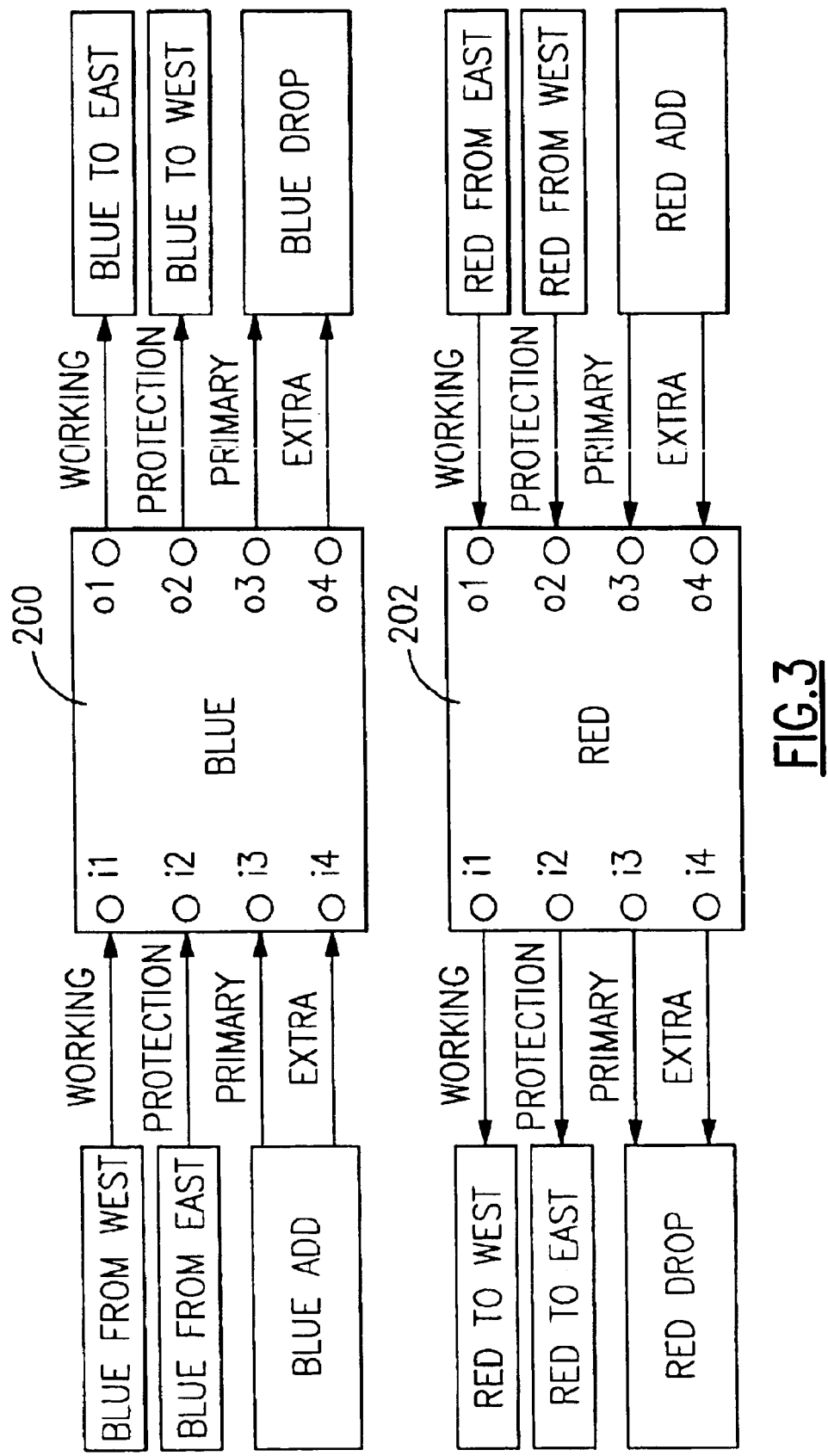
FIG. 3 is a functional block diagram of the optical protection switch shown in FIG. 2.

FIG. 3 is a functional block diagram of the optical protection switch shown in FIG. 2. In this diagram, the blue wavelength switching functionality 200 is separated from the red wavelength switching functionality 202 for clarity of illustration. FIG. 3 shows two things. One, the red wavelength signal and the blue wavelength signals propagate in opposite directions. Also, the dual wavelength switching functionality of 4×4 fabric 20 is a superimposition of the blue wavelength switching functionality 200 with the red wavelength switching functionality 202. The convention used in FIG. 3 will be used in the following FIGS. (4–26) to explain the connectivity of 4×4 switch fabric 20 for its various switch states.

Figure 4:
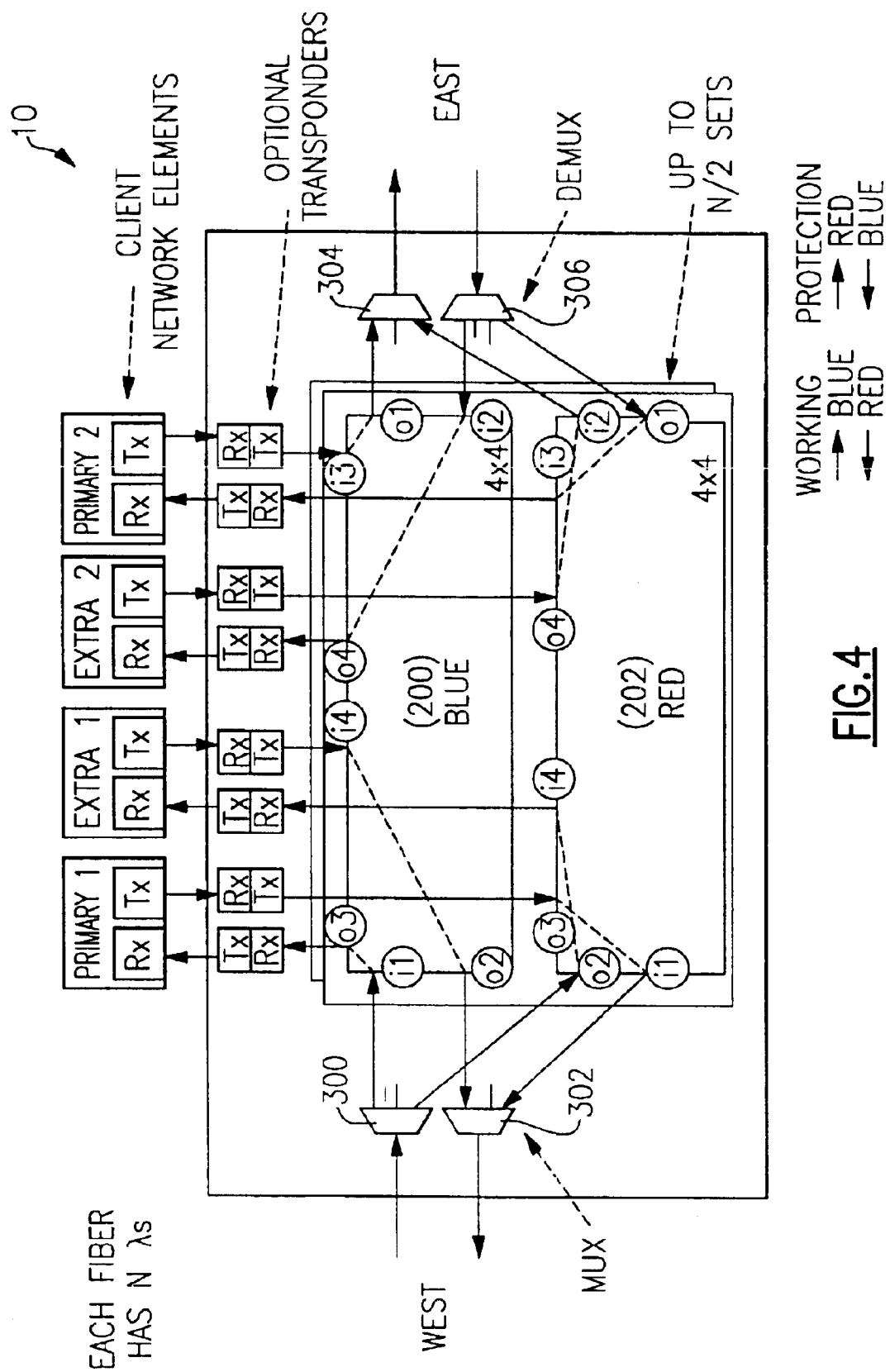
FIG. 4 is a functional block diagram of node A as shown in FIG. 1.
Figure 5:
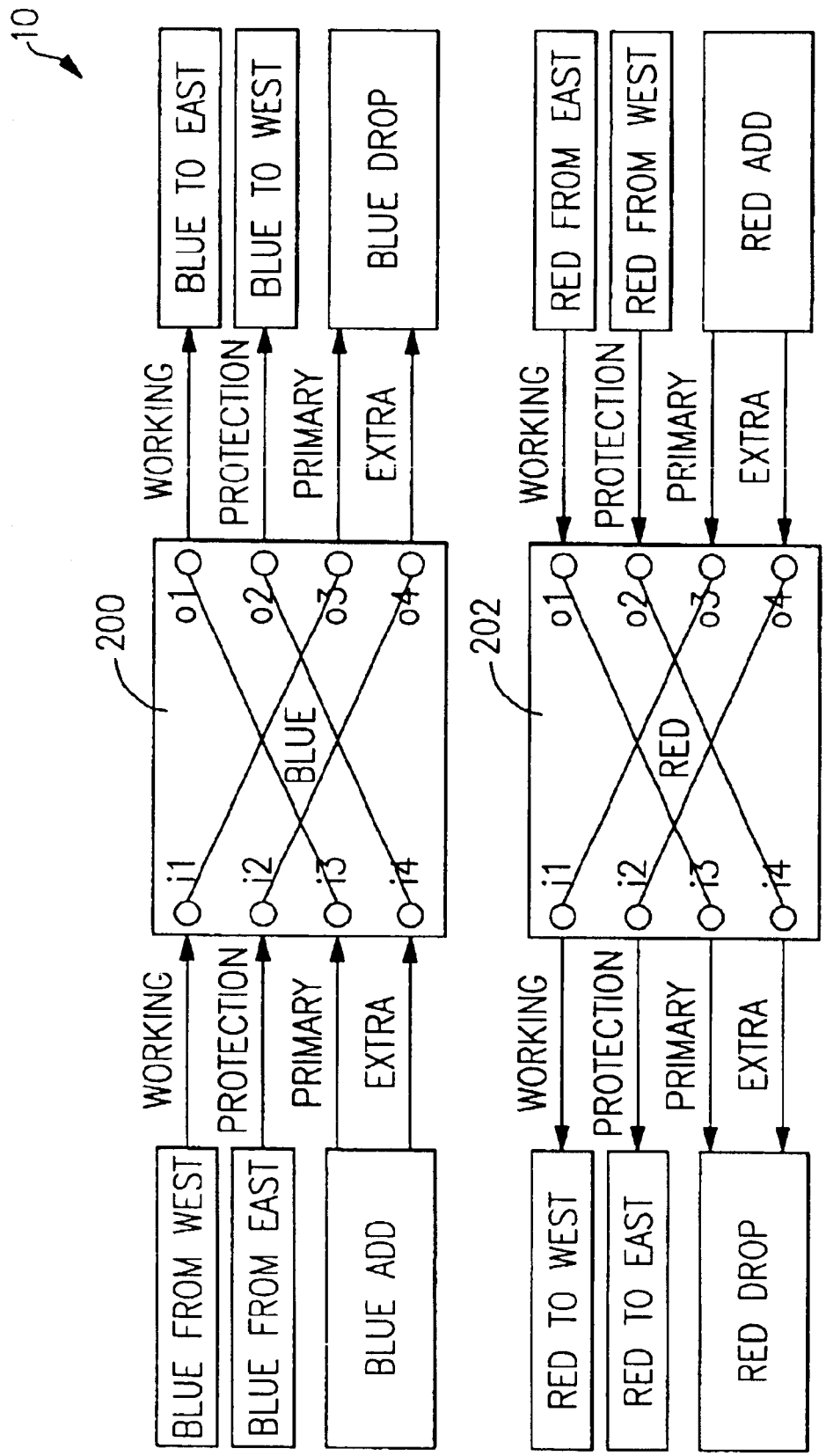
FIG. 5 is a detailed diagram of the protection switch shown in FIG. 4.

FIG. 4 is a functional block diagram of the node A in the two-fiber optical channel shared protection ring 1 as shown in FIG. 1. FIG. 5 is a detailed diagram of the protection switch shown in FIG. 4. As shown in both of these Figures, primary traffic from the west is carried by the blue wavelength, and is dropped into primary client 1. Primary client 1 add traffic is carried by the red wavelength and is provided to the outgoing west fiber by multiplexer 302. Extra traffic from the west is carried by the red wavelength, and is dropped into extra client 1. Extra client 1 add traffic is carried by the blue wavelength and is provided to the outgoing west fiber by multiplexer 302. Primary traffic from the east is carried by the red wavelength, and is dropped into primary client 2. Primary client 2 add traffic is carried by the blue wavelength and is provided to the outgoing east fiber by multiplexer 304. Extra traffic from the east is carried by the blue wavelength, and is dropped into extra client 2. Extra client 2 add traffic is carried by the red wavelength and is provided to the outgoing east fiber by multiplexer 304.

Figure 6:
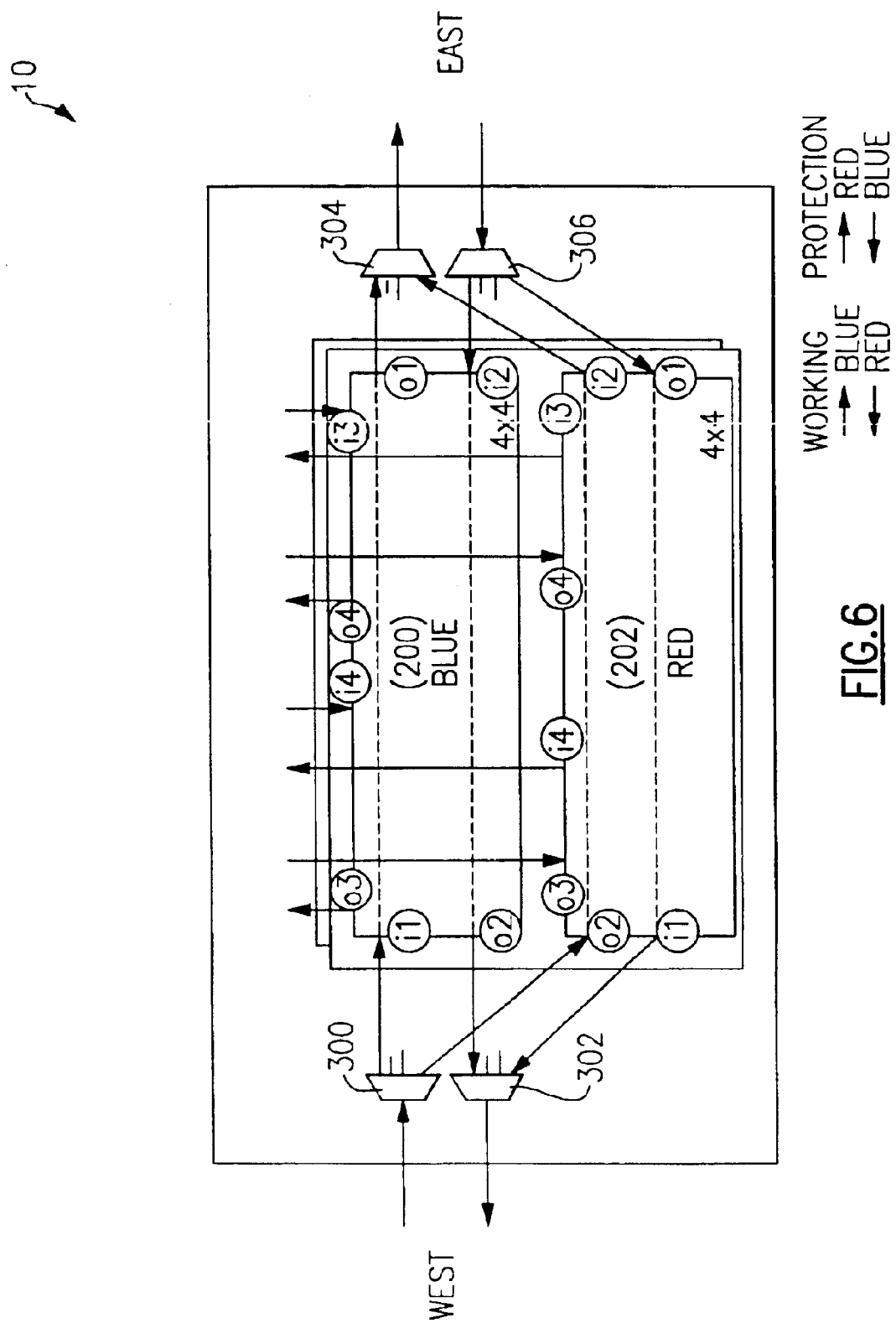
FIG. 6 is a functional block diagram of node B as shown in FIG. 1.
Figure 7:
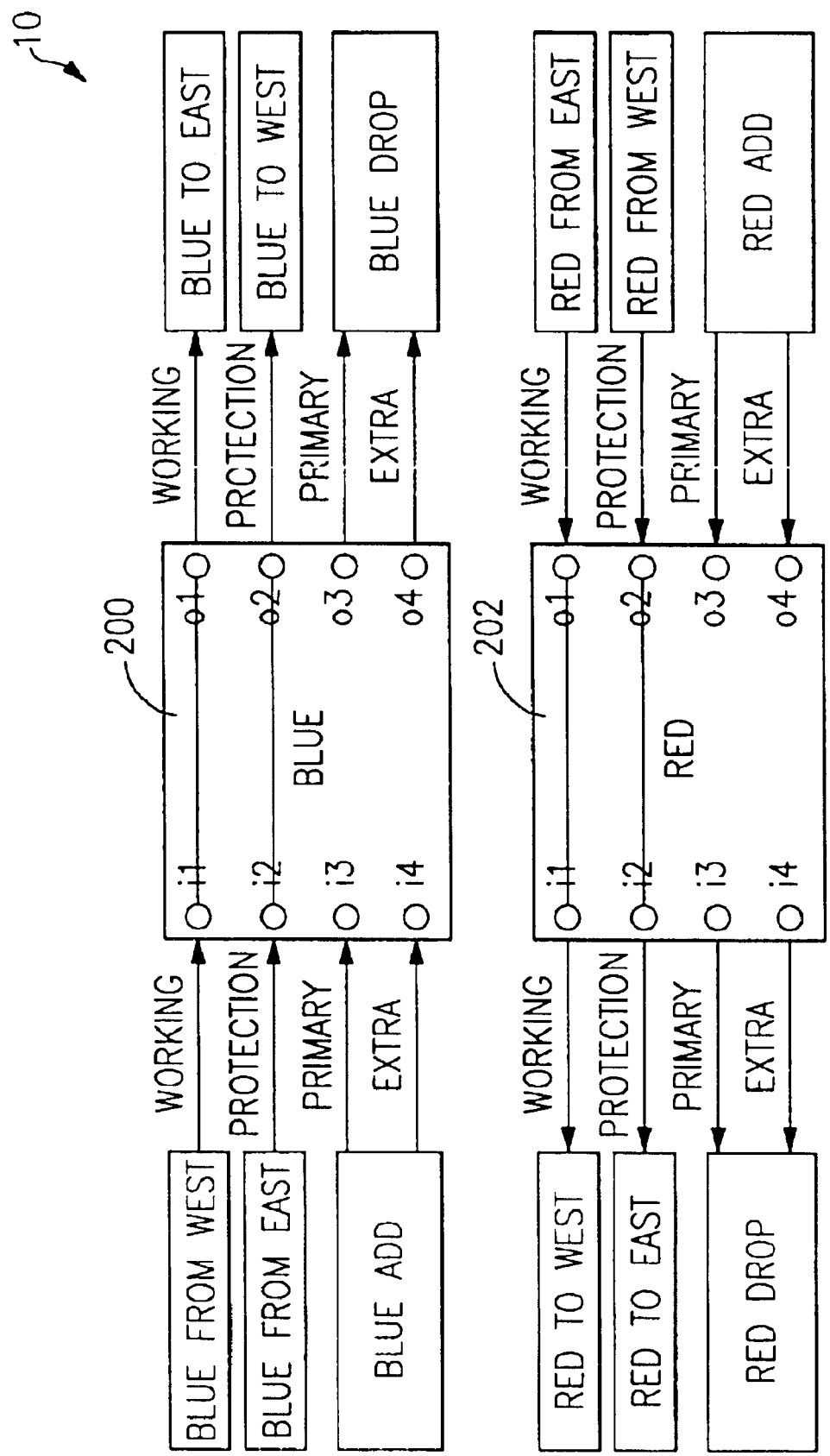
FIG. 7 is a detailed diagram of the protection switch shown in FIG. 6.

FIG. 6 is a functional block diagram of Node B in the two-fiber optical channel shared protection ring 1 shown in FIG. 1. FIG. 7 is a detailed diagram of the protection switch shown in FIG. 6. Referring back to FIG. 1, Node B is a pass-through node. As shown, the working blue wavelength and the protection red wavelength are demultiplexed by demultiplexer 300 and pass through fabric 10 from west to east. Blue switching functionality 200 is in the bar-state. The working red wavelength and the protection blue wavelength are demultiplexed by demultiplexer 306 and pass through fabric 10 from east to west. Red switching functionality 202 is also in the bar-state.

Figure 8:
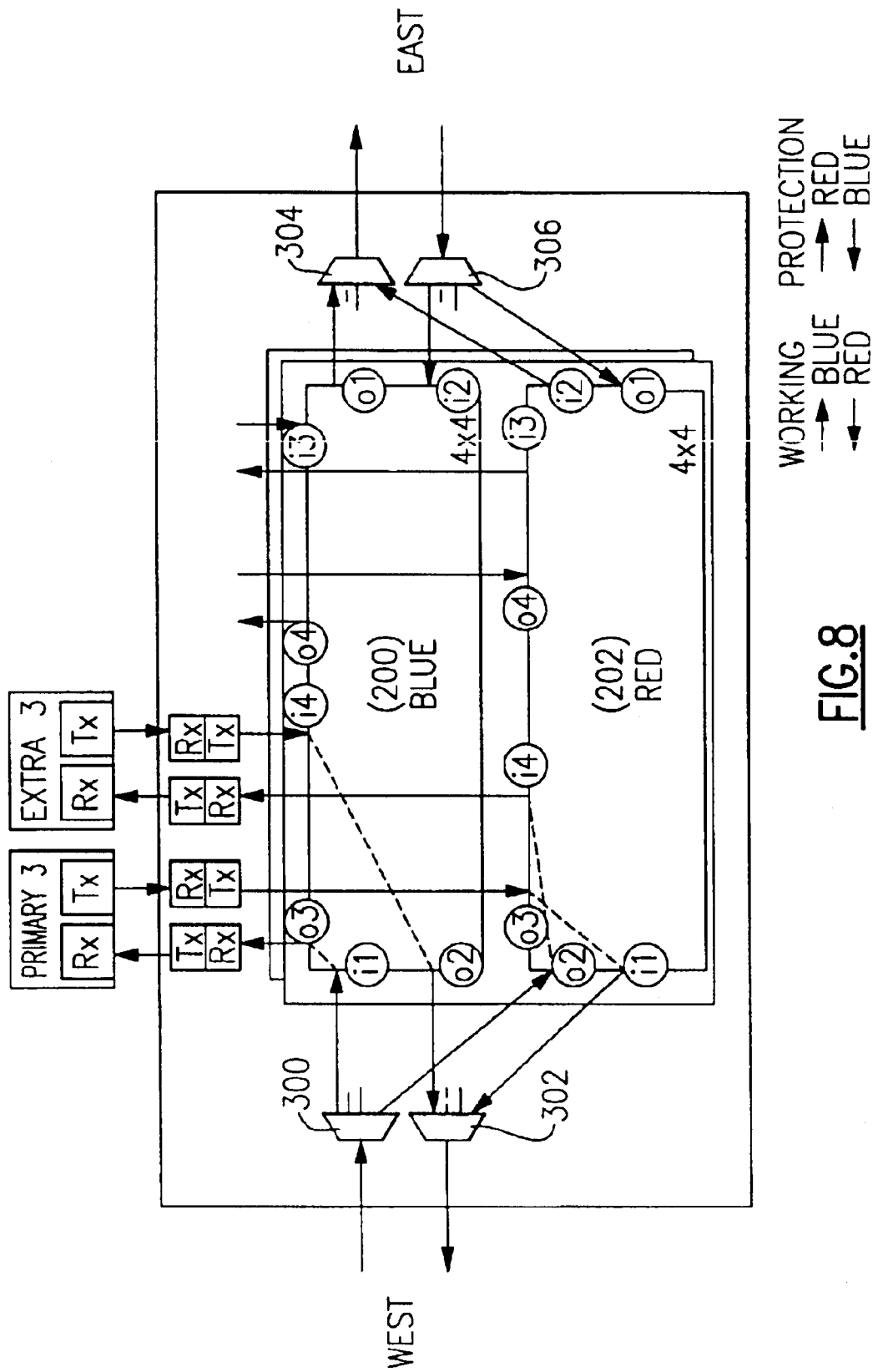
FIG. 8 is a functional block diagram of node C as shown in FIG. 1.
Figure 9:
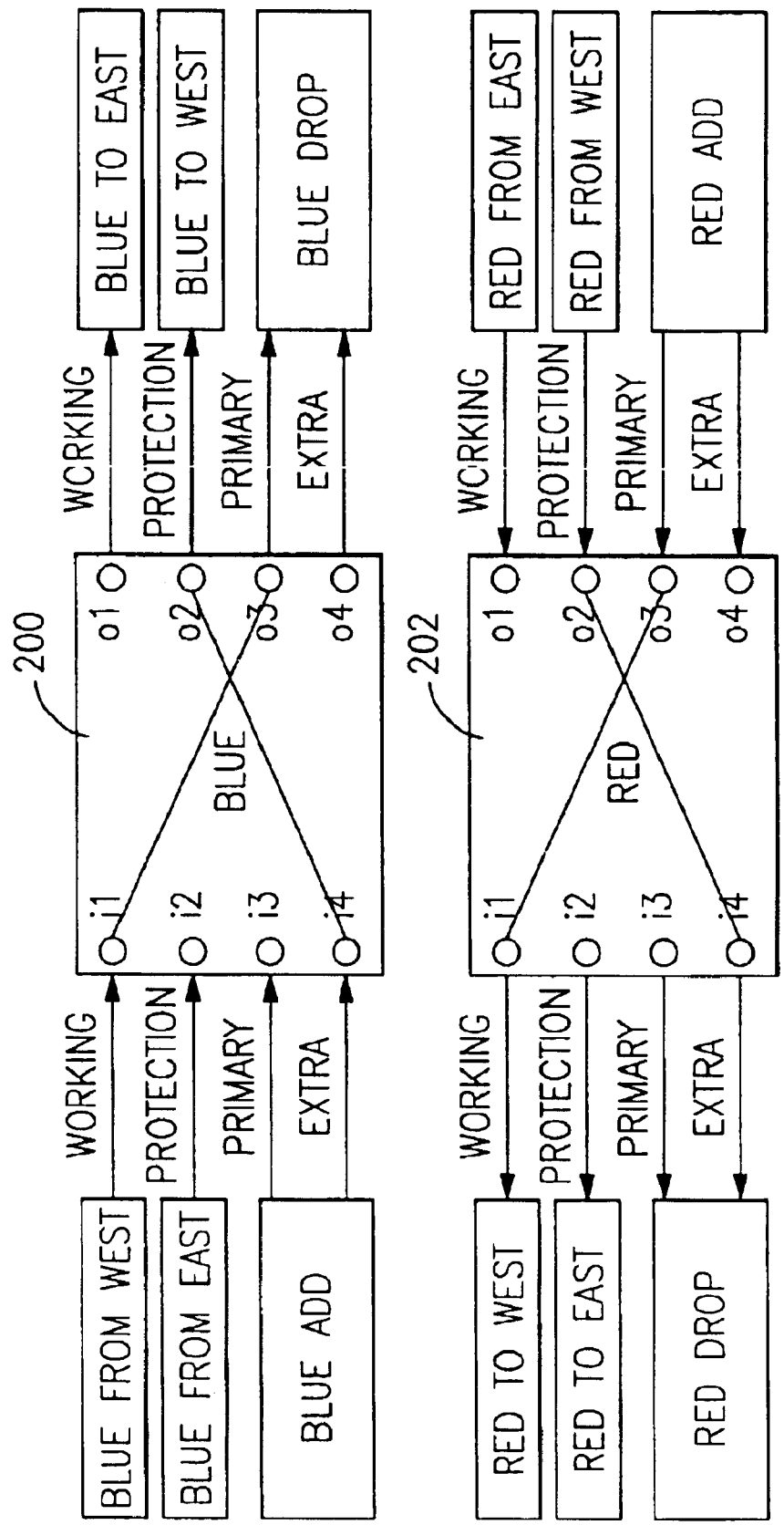
FIG. 9 is a detailed diagram of the protection switch shown in FIG. 8.

FIG. 8 is a functional block diagram of Node C in the two-fiber optical channel shared protection ring 1 shown in FIG. 1. FIG. 9 is a detailed diagram of the protection switch shown in FIG. 8. Referring back to FIG. 1, primary client 3 (Node C) is exchanging primary traffic with primary client 2 (Node A). Extra client 3 (Node C) is also exchanging extra traffic with Extra client 2 (Node A). Thus, the primary traffic from the west being carried by the blue wavelength is dropped into primary client 3. Primary client 3 add traffic is carried by the red wavelength and is provided to the outgoing west fiber by multiplexer 302. Extra traffic from the west being carried by the red wavelength is dropped into extra client 3. Extra client 3 add traffic is carried by the blue wavelength and is also provided to the outgoing west fiber by multiplexer 302.

Figure 10:
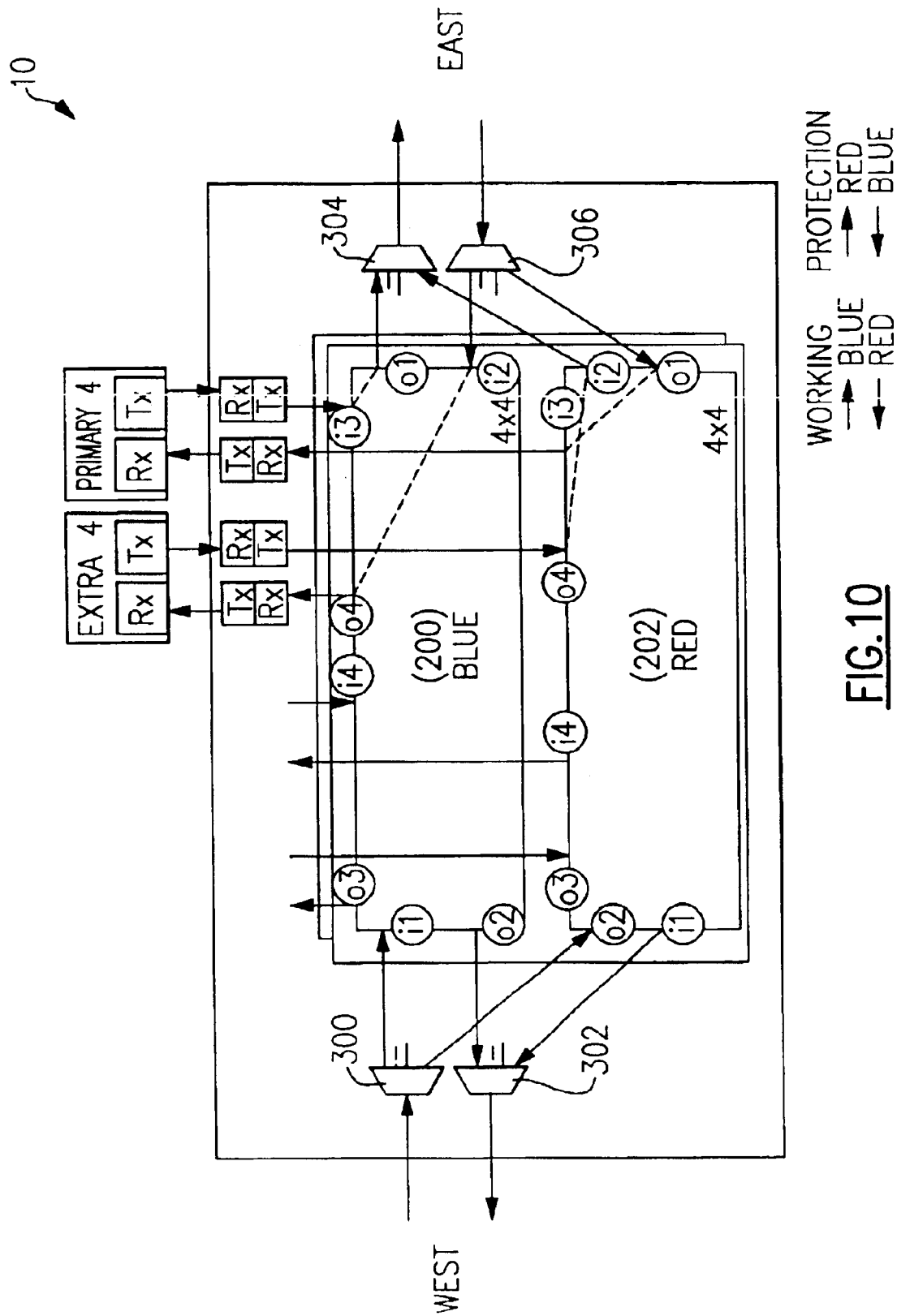
FIG. 10 is a functional block diagram of node D as shown in FIG. 1.
Figure 11:
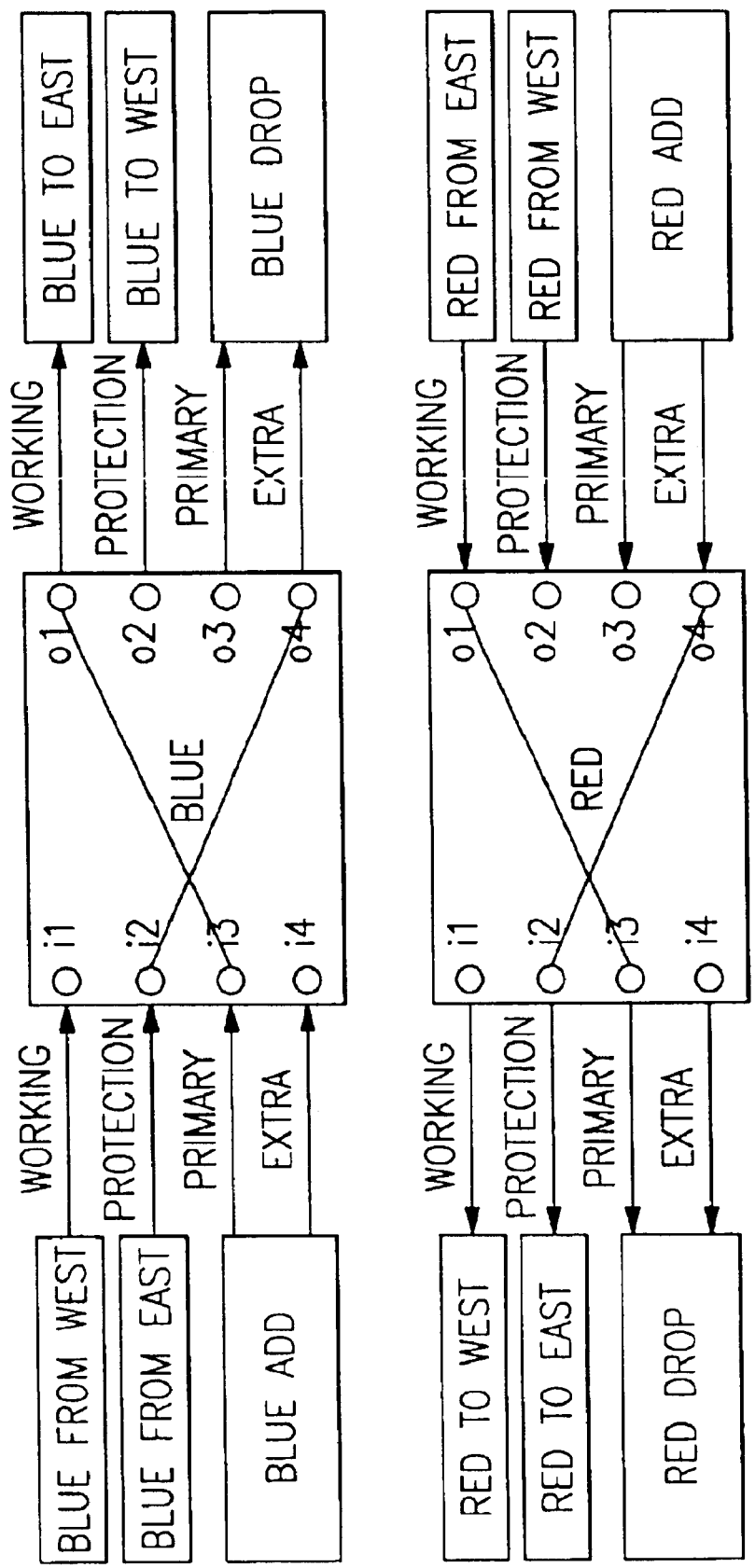
FIG. 11 is a detailed diagram of the protection switch shown in FIG. 10.

FIG. 10 is a functional block diagram of Node D in the two-fiber optical channel shared protection ring 1 shown in FIG. 1. FIG. 11 is a detailed diagram of the protection switch shown in FIG. 10. Referring back to FIG. 1, primary client 4 (Node D) is exchanging primary traffic with primary client 1 (Node A). Extra client 4 (Node C) is also exchanging extra traffic with Extra client 1 (Node A). Fabric 20 is actuated such that the primary traffic from the east being carried by the red wavelength is dropped into primary client 4. Primary client 4 add traffic is carried by the blue wavelength and is provided to the outgoing east fiber by multiplexer 304. Extra traffic from the east being carried by the blue wavelength is dropped into extra client 4. Extra client 4 add traffic is carried by the red wavelength and is also provided to the outgoing east fiber by multiplexer 304.

Figure 12:
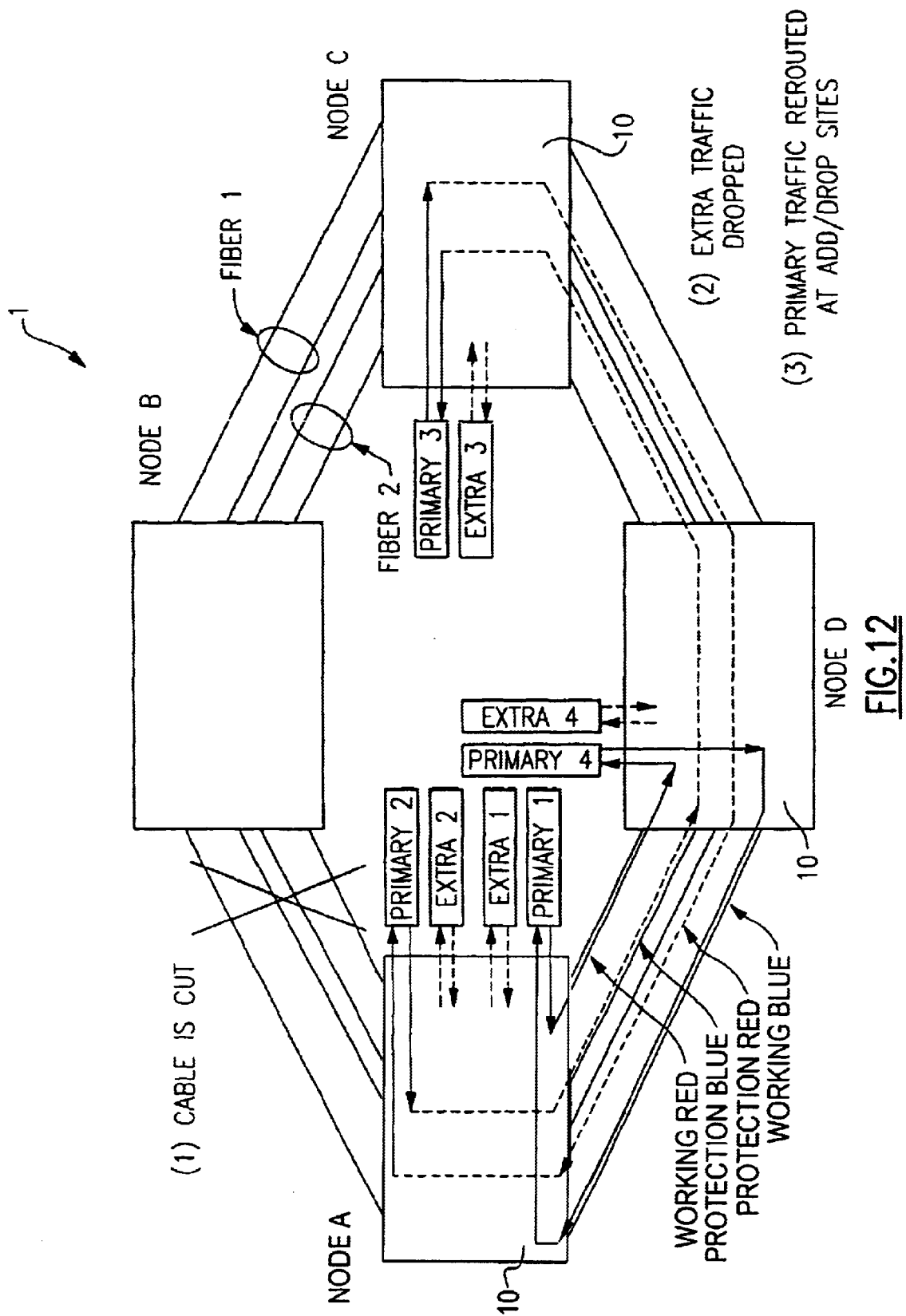
FIG. 12 is a block diagram of the two-fiber optical channel shared protection ring of the present invention under a cable cut fault condition.

Referring to FIG. 12, a block diagram of the two-fiber optical channel shared protection ring of the present invention under a fault condition is disclosed. In this scenario, the fiber cable spanning Node A and Node B is cut. Because of the cable cut, the primary traffic between primary client 2 (Node A) and primary client 3 (Node C) is interrupted. The traffic between primary client 1 (Node A) and primary client 4 (Node D) is uninterrupted. In response to the interruption of primary traffic, extra traffic is dropped and primary traffic is re-routed as shown in the following Figures.

Figure 13:
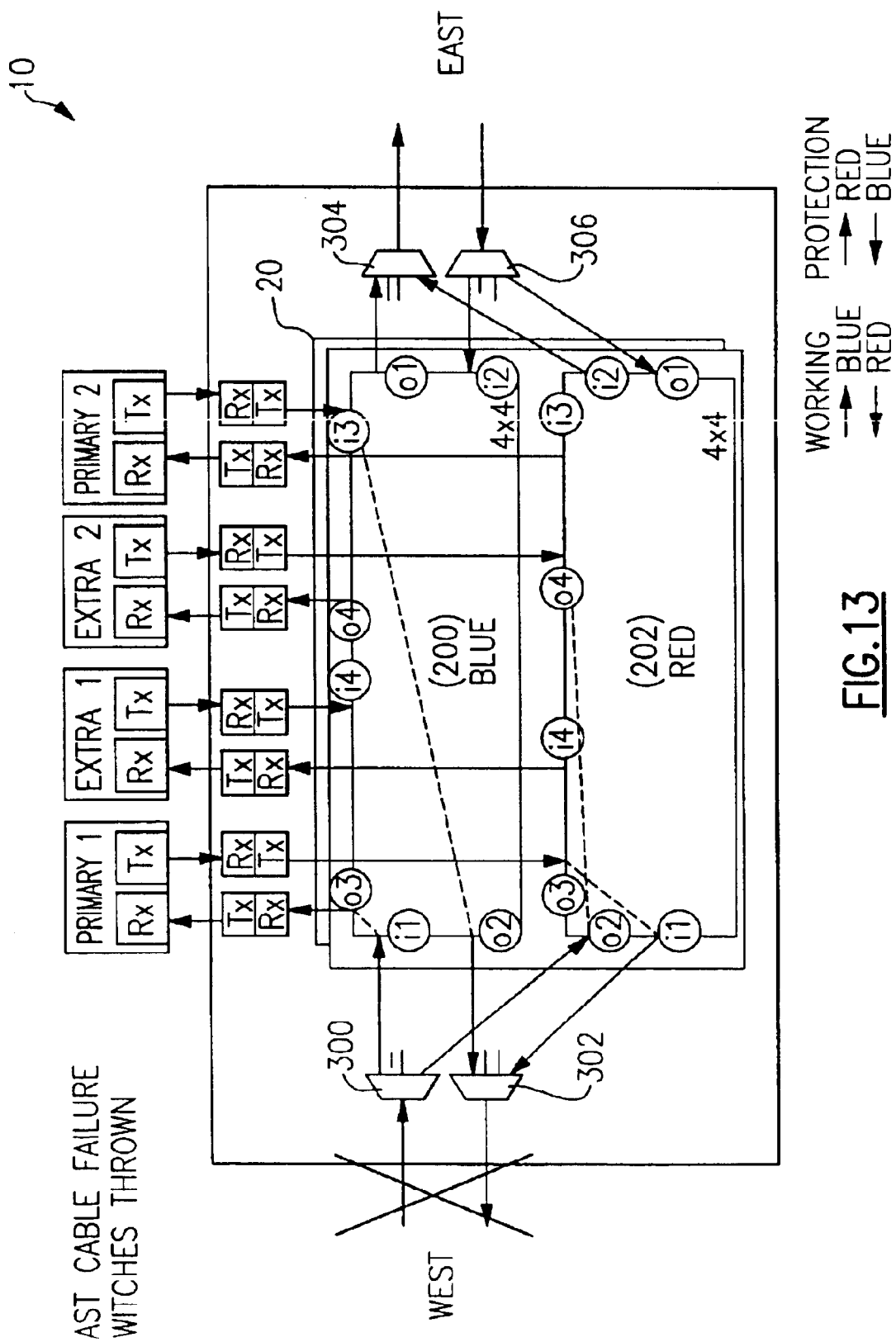
FIG. 13 is a functional block diagram of node A as shown in FIG. 12.
Figure 14:
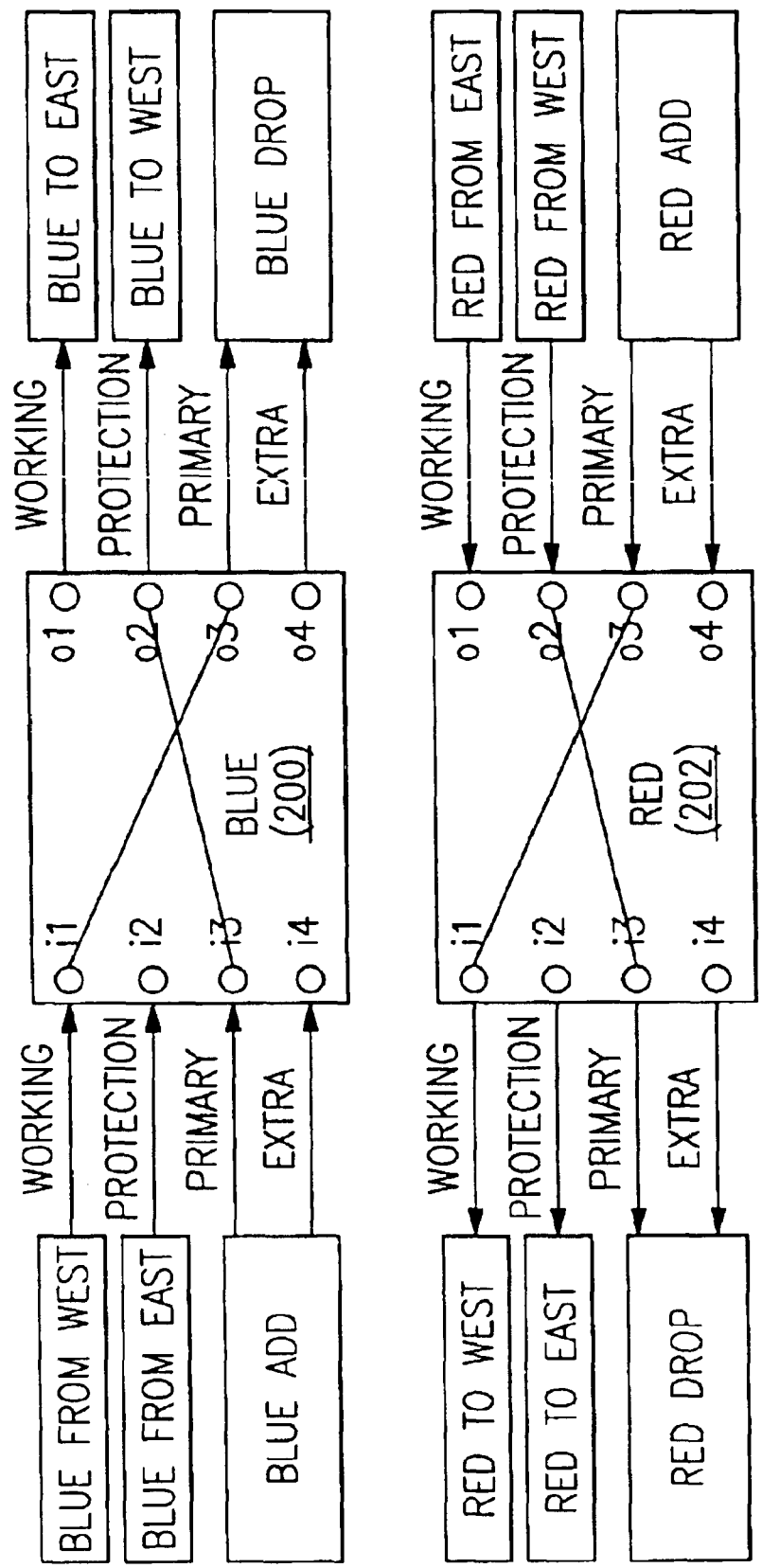
FIG. 14 is a detailed diagram of the protection switch shown in FIG. 13.

FIG. 13 is a functional block diagram of Node A in the two-fiber optical channel shared protection ring 1 shown in FIG. 12. FIG. 14 is a detailed diagram of the protection switch shown in FIG. 13. In response to the cable cut, all extra traffic is pre-empted. The traffic between primary client 1 (Node A) and primary client 4 (Node D) is uninterrupted. Thus, primary traffic from the west being carried by the working blue wavelength is dropped into primary client 1. Primary client 1 add traffic is carried by the working red wavelength and is provided to the outgoing west fiber by multiplexer 302. However, the primary traffic exchanged between primary client 2 (Node A) and primary client 3 (Node C) is carried by the protection wavelengths. Thus, switch fabric 20 is actuated to carry primary client 2 add traffic on the protection blue wavelength in fiber 2. Primary traffic from client 3 is carried by the protection red wavelength propagating on fiber 1 dropped to client 2 by switch fabric 20.

Figure 15:
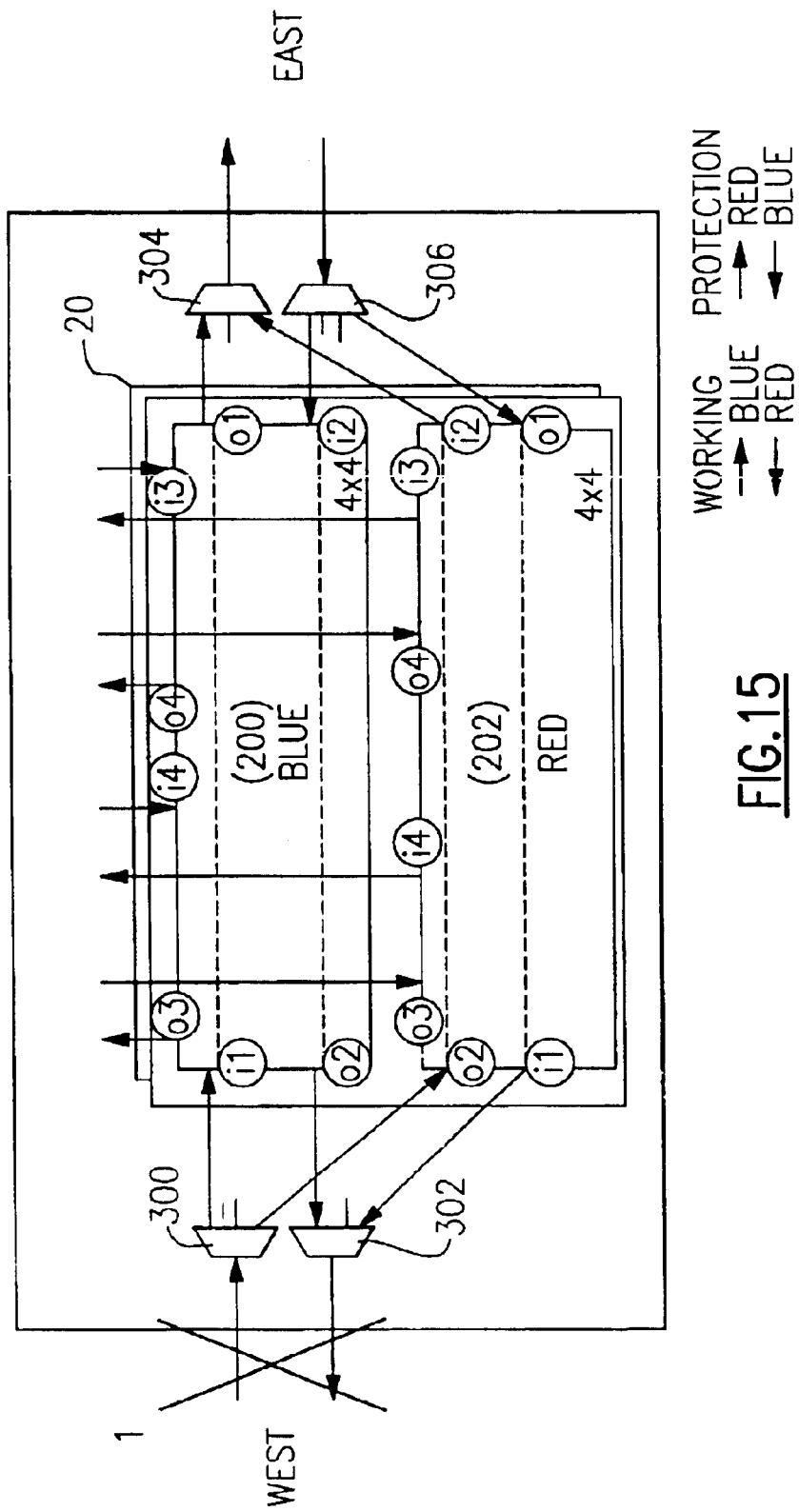
FIG. 15 is a functional block diagram of node B as shown in FIG. 12.
Figure 16:
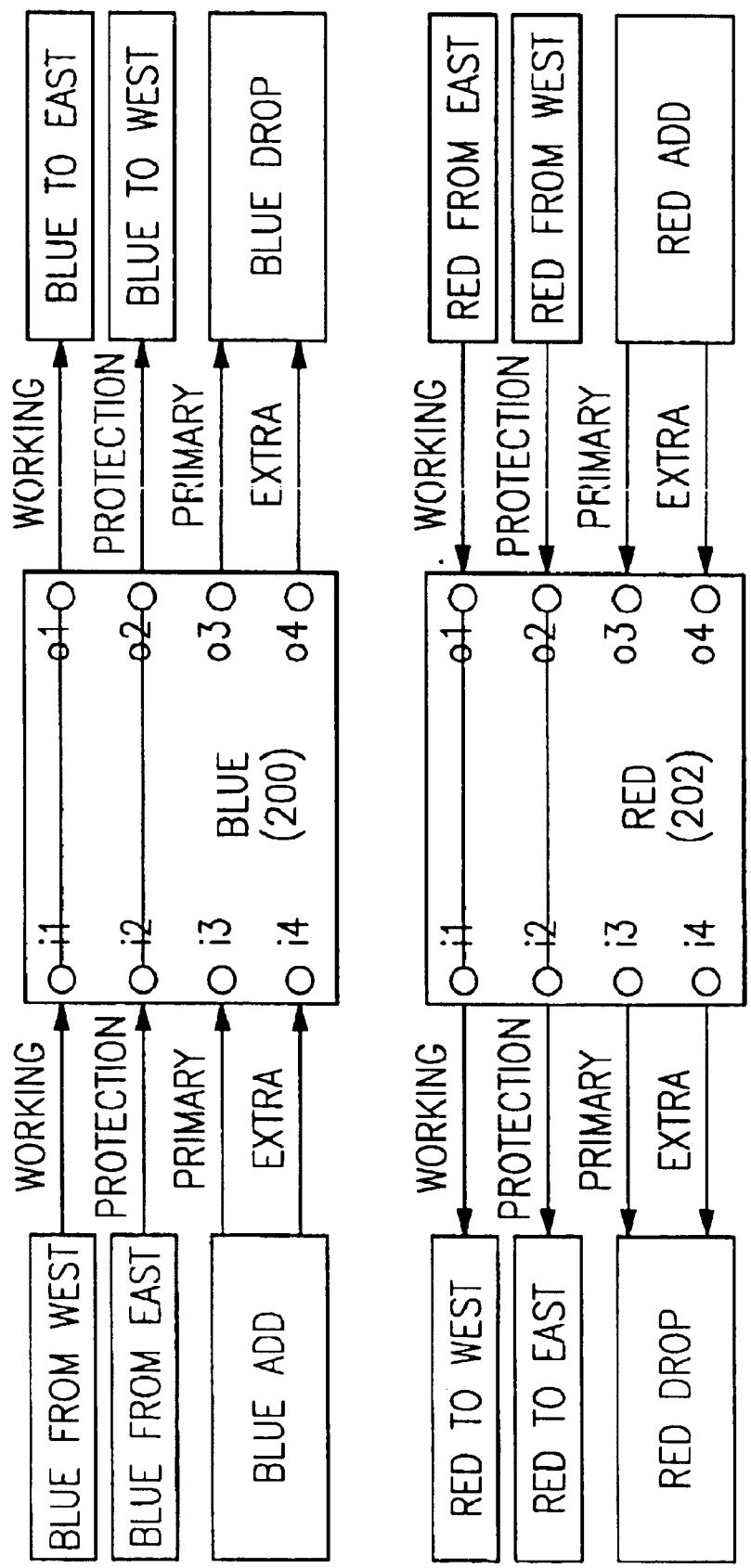
FIG. 16 is a detailed diagram of the protection switch shown in FIG. 15.

FIG. 15 is a functional block diagram of Node B in the two-fiber optical channel shared protection ring 1 shown in FIG. 12. FIG. 16 is a detailed diagram of the protection switch shown in FIG. 15. As shown, the fiber west fiber cable is severed. Since, Node B is a pass through node and no traffic is either dropped or added, switch fabric 20 is not actuated in response to the cable cut.

Figure 17:
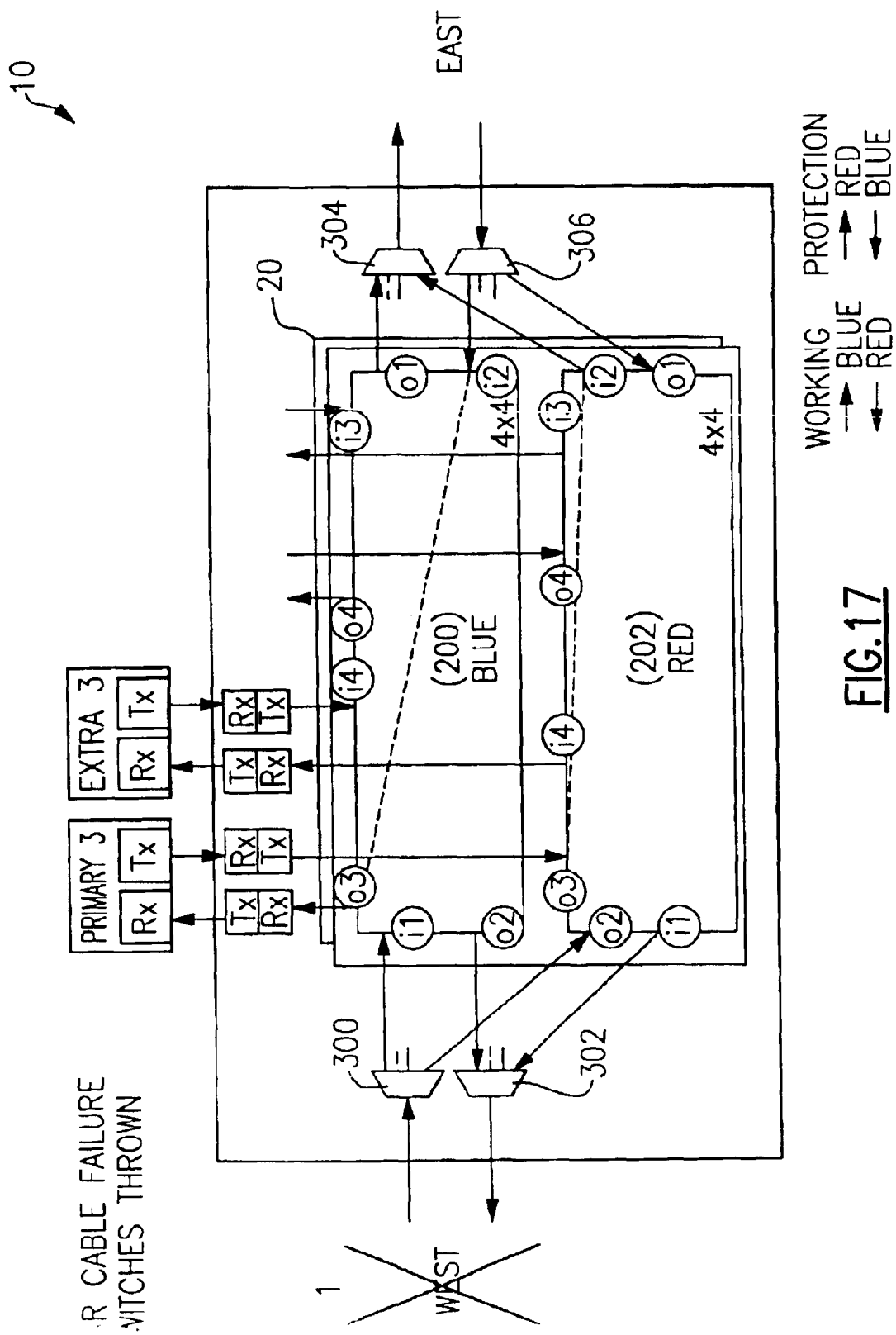
FIG. 17 is a functional block diagram of node C as shown in FIG. 12.
Figure 18:
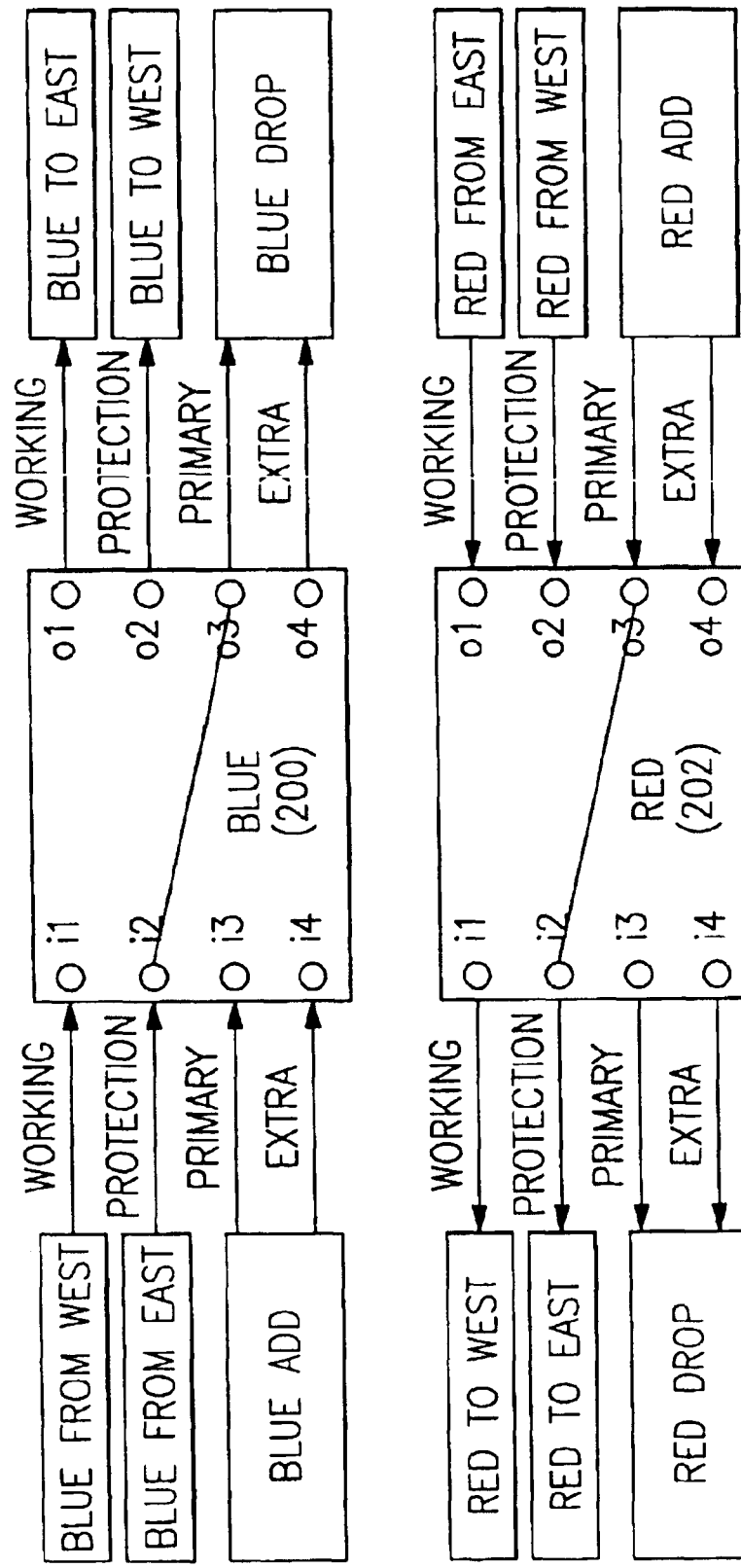
FIG. 18 is a detailed diagram of the protection switch shown in FIG. 17.

FIG. 17 is a functional block diagram of Node C in the two-fiber optical channel shared protection ring 1 shown in FIG. 12. FIG. 18 is a detailed diagram of the protection switch shown in FIG. 17. Because of the cable cut between Node A and Node B, no traffic is supported by the fibers in the west. Under normal conditions, primary traffic is dropped to primary client 3 via the working blue wavelength coming from the west on fiber 1. Primary client 3 add traffic is carried by the red wavelength and is provided to the outgoing west fiber by multiplexer 302. In response to the cable cut, client 2 (Node A) transmits primary client 2 add traffic on the protection blue wavelength in fiber 2 coming from the east. Switch fabric 20 is directed to adjust to the change by connecting the primary client 3 drop port to the protection blue wavelength. Switch fabric 20 is also actuated such that primary client 3 add traffic is carried by the protection red wavelength signal and is provided to the outgoing east fiber by multiplexer 304.

Figure 19:
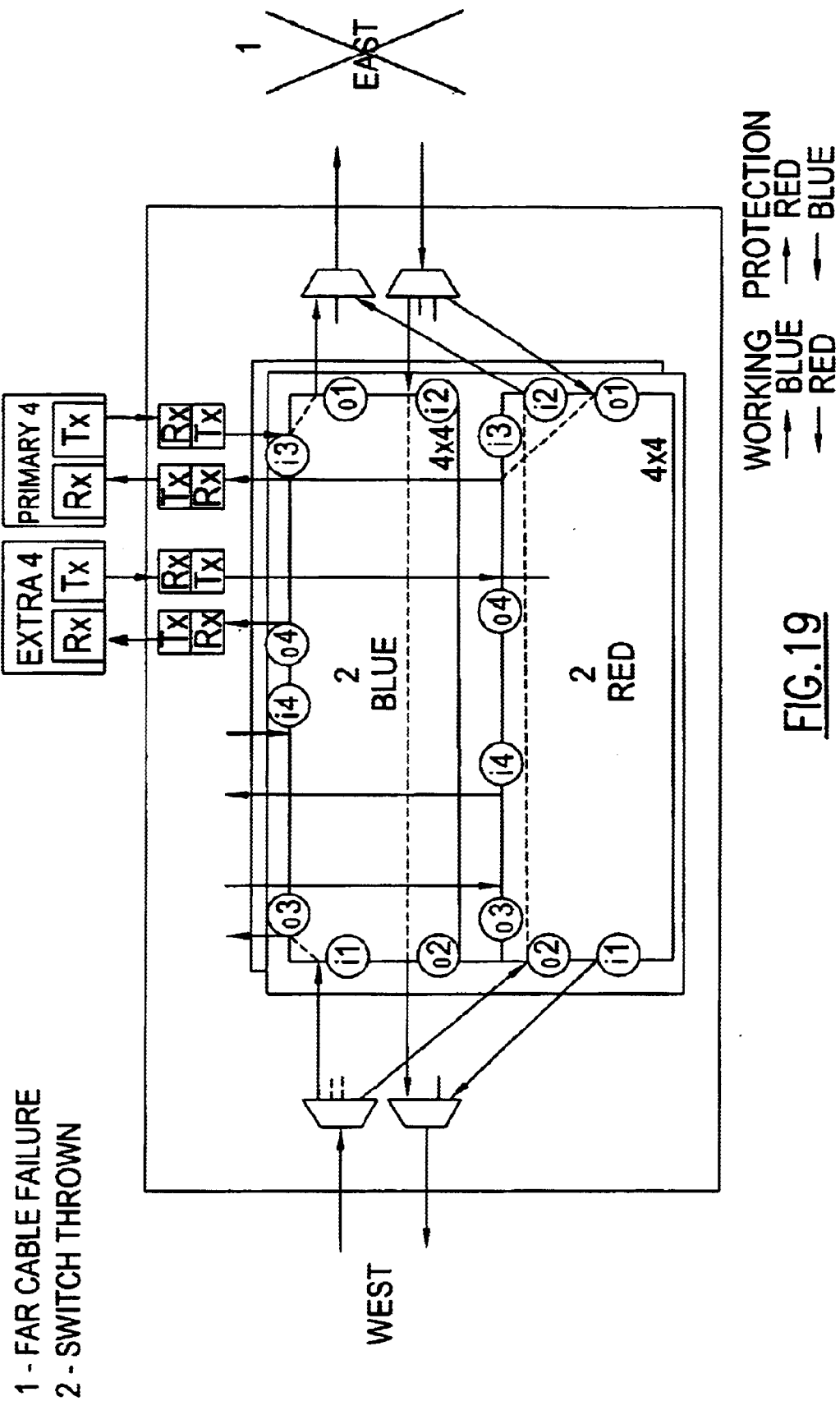
FIG. 19 is a functional block diagram of node D as shown in FIG. 12.
Figure 20:
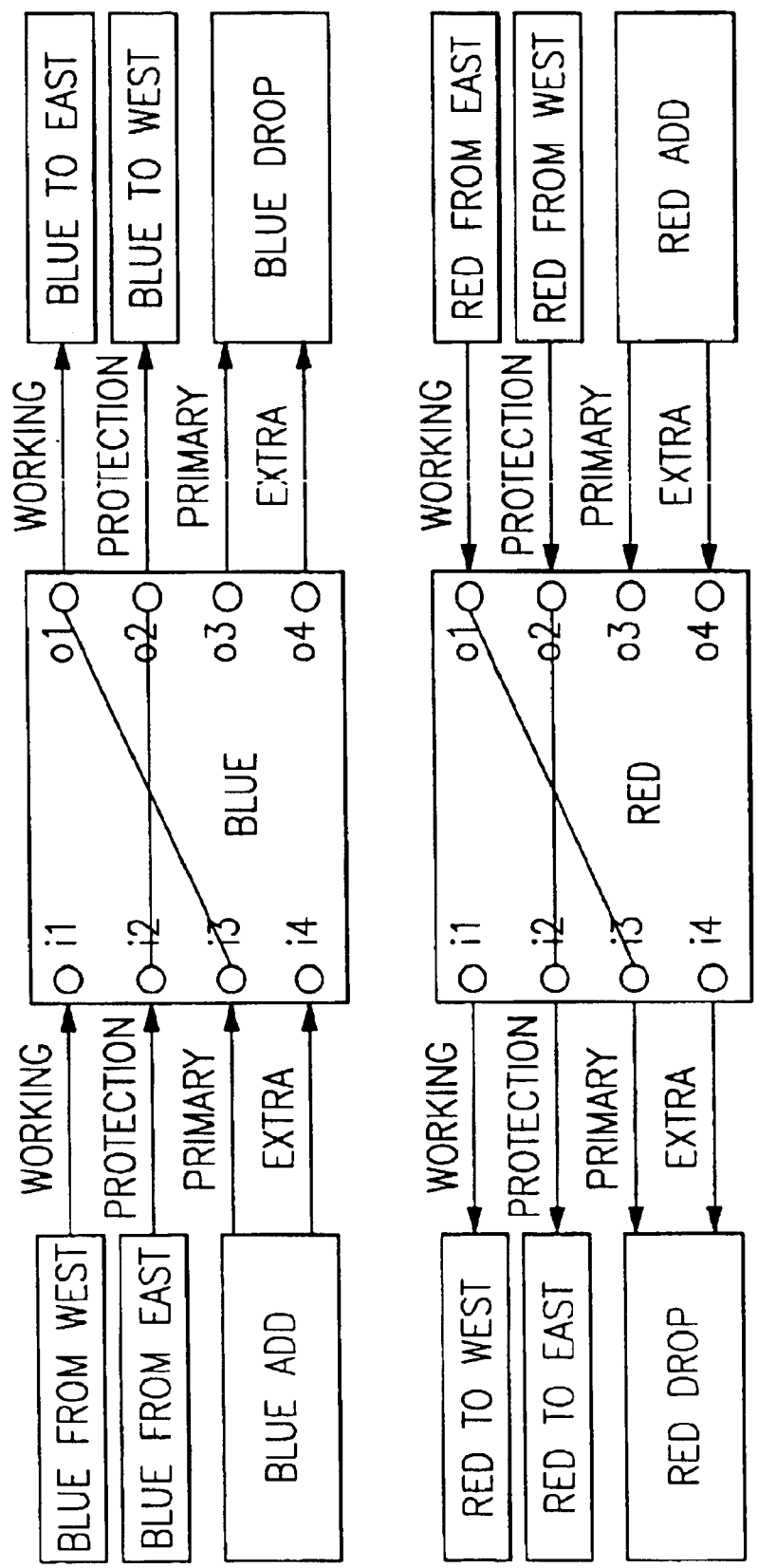
FIG. 20 is a detailed diagram of the protection switch shown in FIG. 19.

FIG. 19 is a functional block diagram of Node D in the two-fiber optical channel shared protection ring 1 shown in FIG. 12. FIG. 20 is a detailed diagram of the protection switch shown in FIG. 19. Because traffic between client 4 and client 1 (Node A) is uninterrupted, the primary traffic from the east being carried by the red wavelength is dropped into primary client 4 as before. Likewise, primary client 4 add traffic is carried by the blue wavelength and is provided to the outgoing east fiber by multiplexer 304. However, in order to allow primary traffic to be exchanged between primary client 2 (Node A) and primary client 3 (Node C) to pass through Node D via the protection wavelengths, the protection blue wavelength signal is switched to pass through the node from west to east, and the protection red wavelength signal is switched to pass through the node from east to west.

Figure 21:
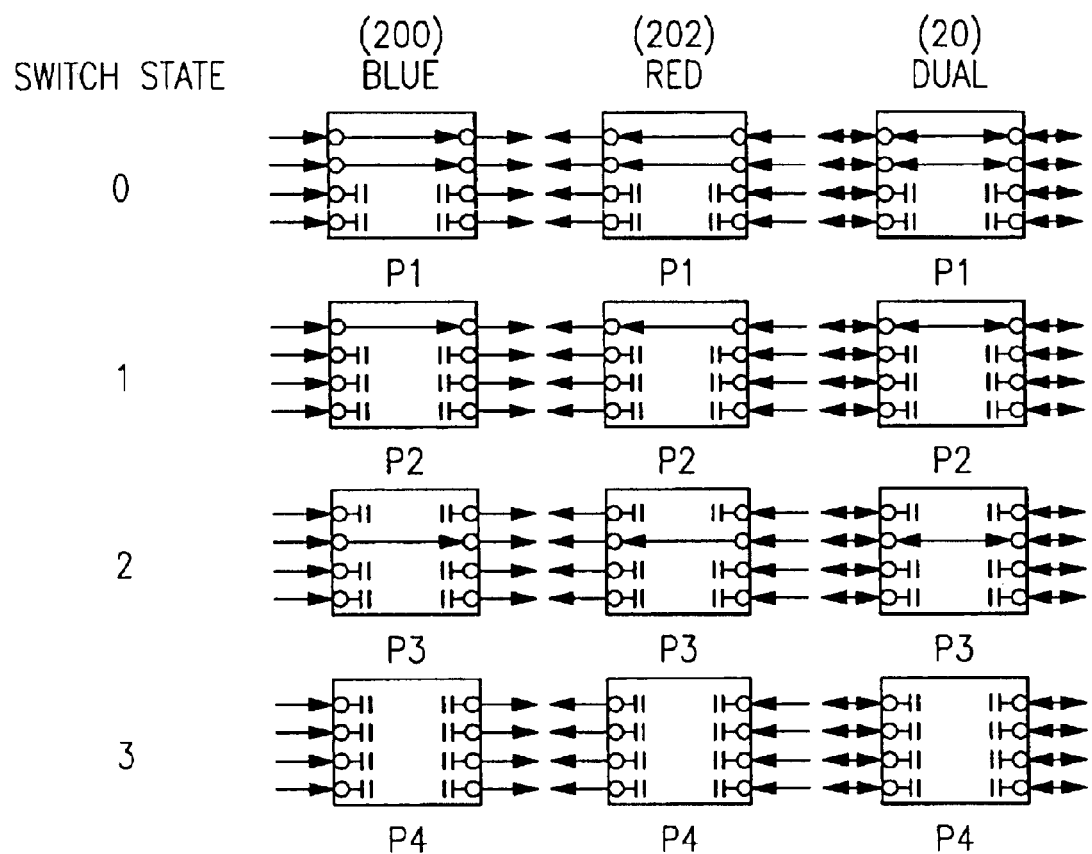
FIG. 21 is a functional block diagram of a 4×4 optical protection switch in a passthrough mode.

Referring to FIG. 21, a functional block diagram of a 4×4 optical protection switch in a pass-through mode in accordance with the present invention is disclosed. This Figure uses the same convention used in FIG. 3: the actual switch state diagram of 4×4 switch fabric 20 is shown under the "dual column," whereas the blue wavelength switching functionality 200 is shown as being separated from the red wavelength switching functionality 202 for clarity of illustration. In switch state zero (0), all of the wavelength signals (working and protection) are in the bar state. In switch state one (1), only the working blue wavelength signal and the working red wavelength signal are in the bar state. The protection wavelength signals are not. In switch state two (2), the protection blue wavelength signal and the protection red wavelength signal are in the bar state. The working wavelength signals are not.

Figure 22:
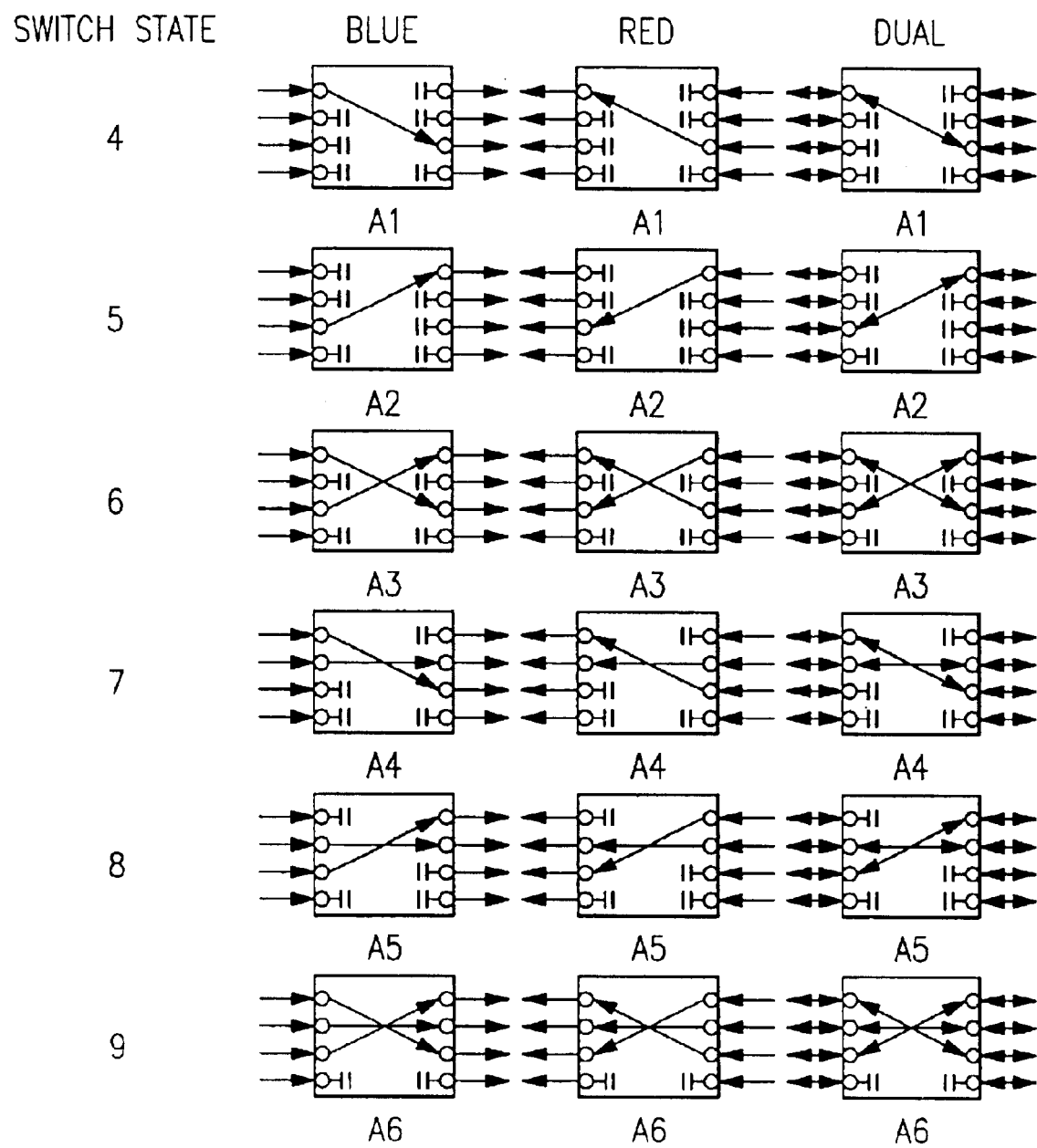
FIG. 22 is a functional block diagram of a 4×4 optical protection switch in a primary traffic add/drop mode.

Referring to FIG. 22, a functional block diagram of a 4×4 optical protection switch in a primary traffic add/drop mode is disclosed. In switch state four (4), primary traffic from working blue wavelength is dropped to the primary client. Primary client traffic is added via the working red wavelength. In the next switch state, the roles are reversed as primary traffic carried by the red wavelength is dropped and primary traffic is added by way of the blue wavelength. In switch state six (6), primary traffic carried by both the blue wavelength and the red wavelength is dropped, and primary traffic is added by way of both the blue wavelength and the red wavelength. In the next switch state, primary traffic from working blue wavelength is dropped to the primary client, primary client traffic is added via the working red wavelength, and extra traffic carried in opposite directions by the protection blue wavelength and the protection red wavelength are passed through the node. The eight switch state (8) is similar, except that primary traffic carried by the red wavelength is dropped and primary traffic is added by way of the blue wavelength. Extra traffic carried in opposite directions by the protection blue wavelength and the protection red wavelength are passed through the node. The ninth switch state is much like the sixth switch state, except that extra traffic carried in opposite directions by the protection blue wavelength and the protection red wavelength are passed through the node.

Figure 23:
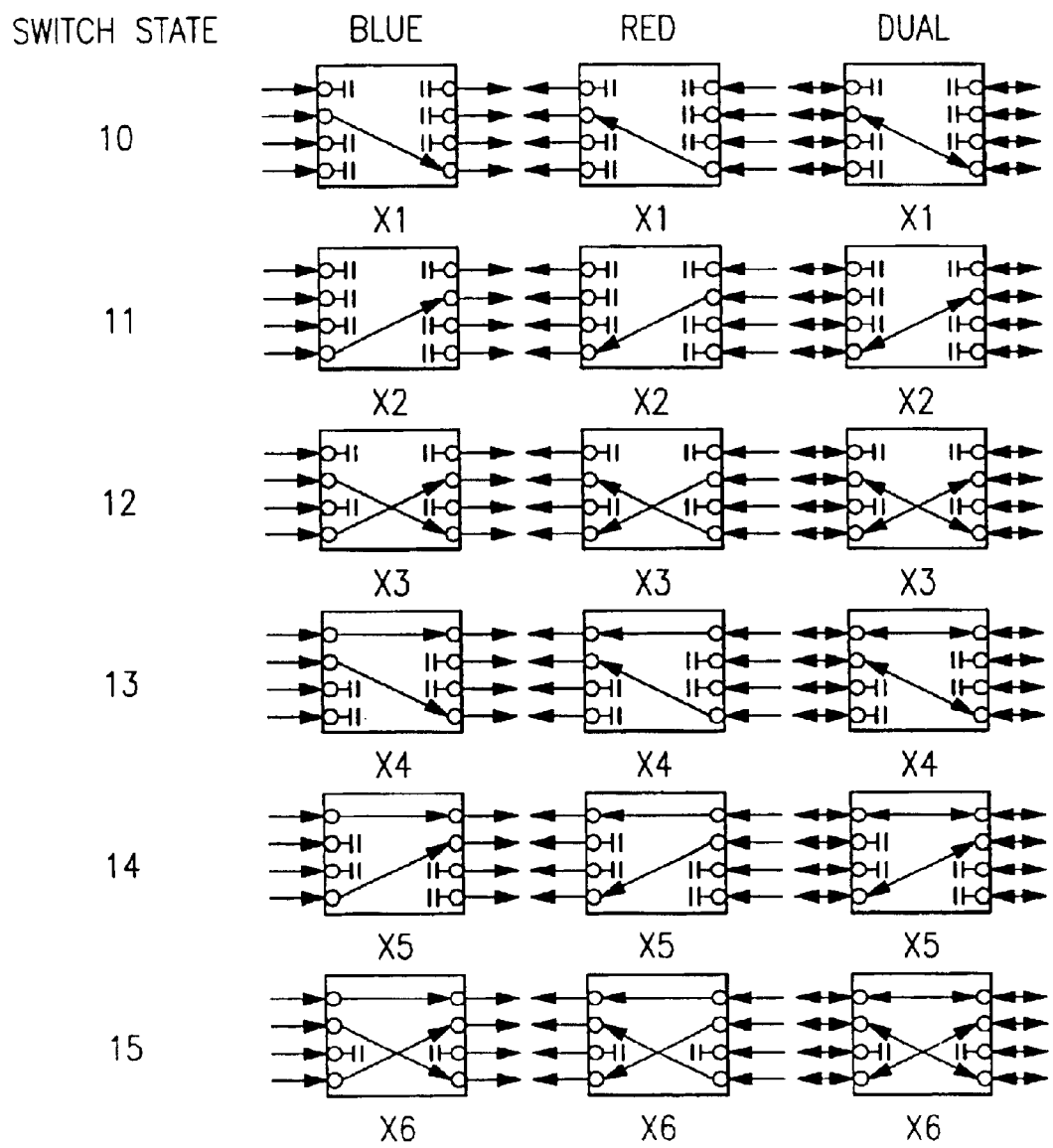
FIG. 23 is a functional block diagram of a 4×4 optical protection switch in a extra traffic add/drop mode.

Referring to FIG. 23, a functional block diagram of a 4×4 optical protection switch in a extra traffic add/drop mode is disclosed. FIG. 23 is analogous to FIG. 22, except that the add/drop switching operations involve the extra traffic instead of the primary traffic. For example, the tenth (10) switch state is much like the fourth (4) state. Extra traffic from the protection blue wavelength is dropped to the extra client, and extra client traffic is added via the protection red wavelength. In the eleventh (11) switch state, extra traffic from the protection red wavelength is dropped to the extra client, whereas extra client traffic is added via the protection blue wavelength. Extra traffic carried by both the blue wavelength and the red wavelength is dropped in the twelfth (12) switch state. Extra traffic is also added by way of both the blue wavelength and the red wavelength. As seen by comparing FIG. 23 with FIG. 22, switch state 13 corresponds to switch state 7, switch state 14 corresponds to switch state 8, and switch state 15 corresponds to switch state 9. Again, the difference being that the protection wavelength signals are switched instead of the working wavelength signals.

Figure 24:
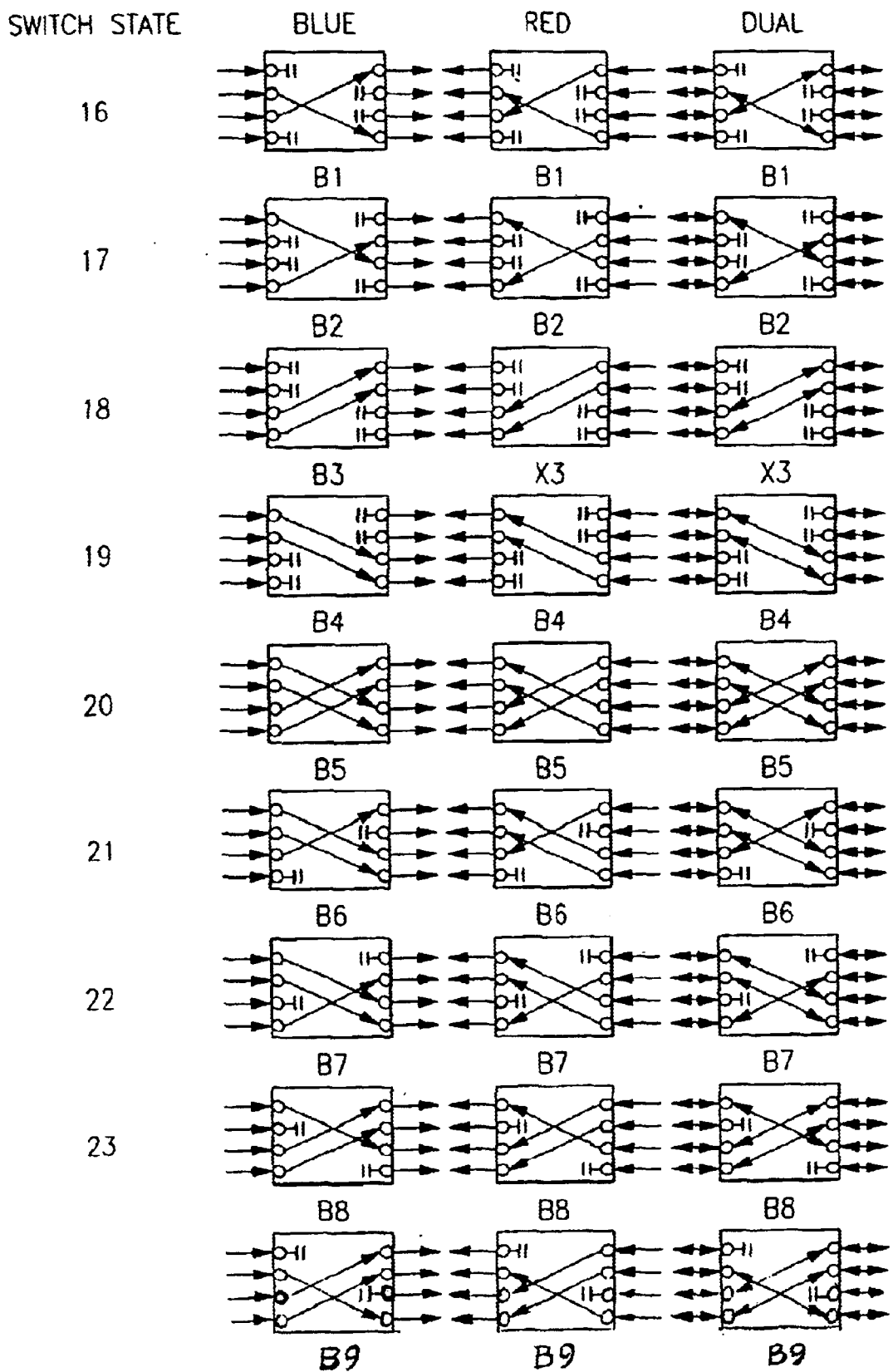
FIG. 24 is a functional block diagram of a 4×4 optical protection switch in a primary traffic and extra traffic add/drop mode.
Figure 25:
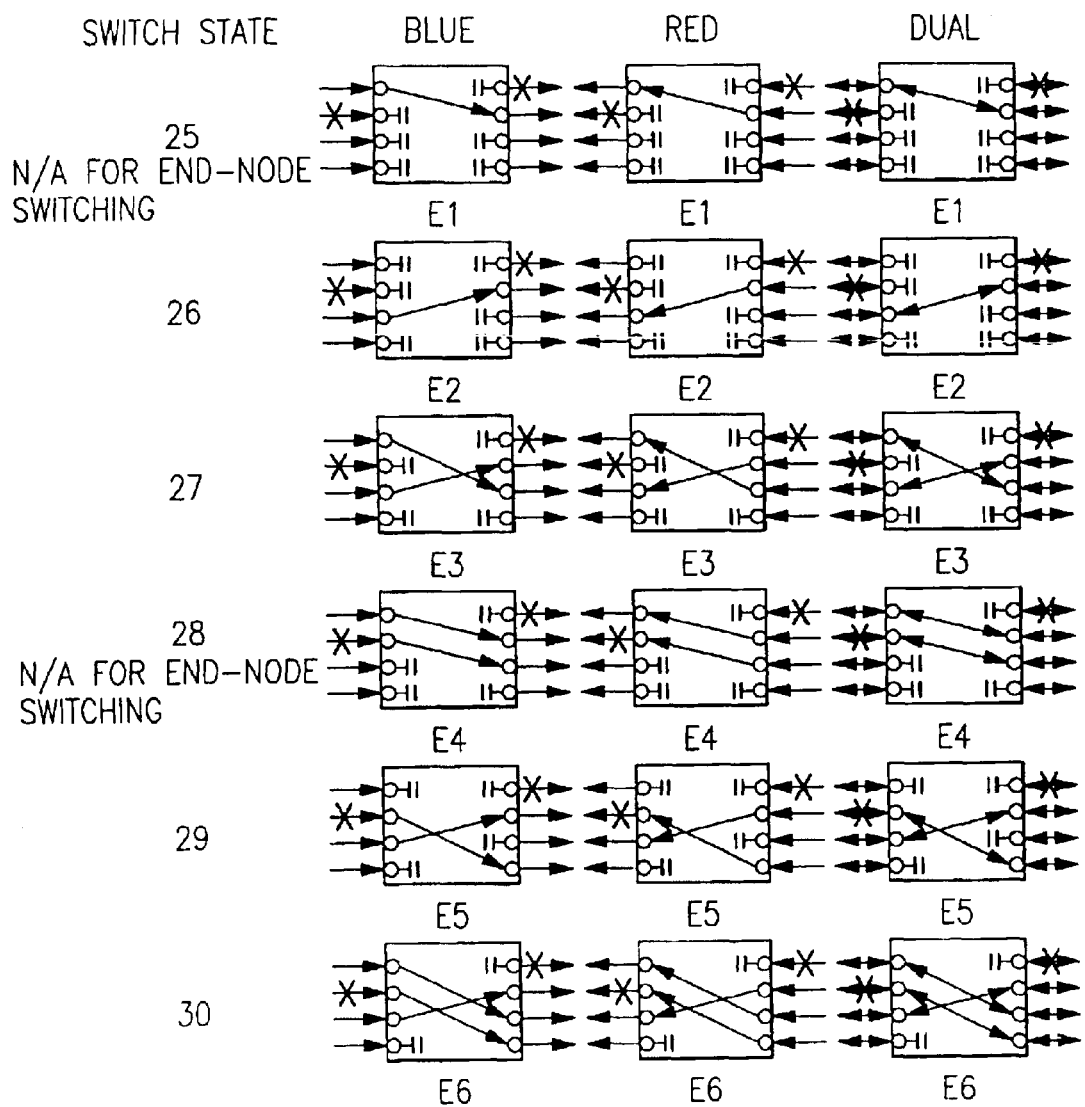
FIG. 25 is a functional block diagram of a 4×4 optical protection switch in a "east" failure mode.
Figure 26:
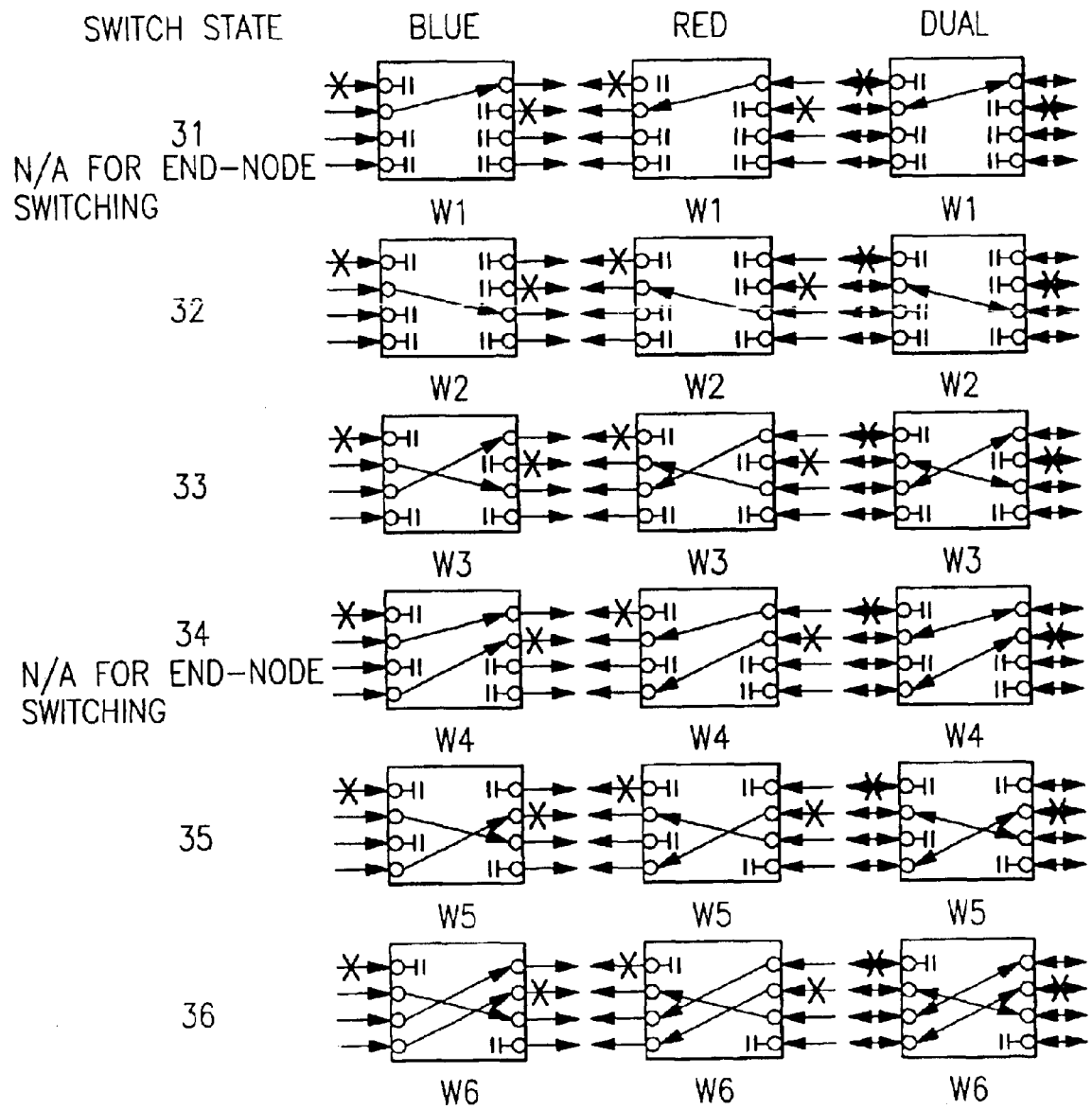
FIG. 26 is a functional block diagram of a 4×4 optical protection switch in a "west" failure mode.
Figure 27:
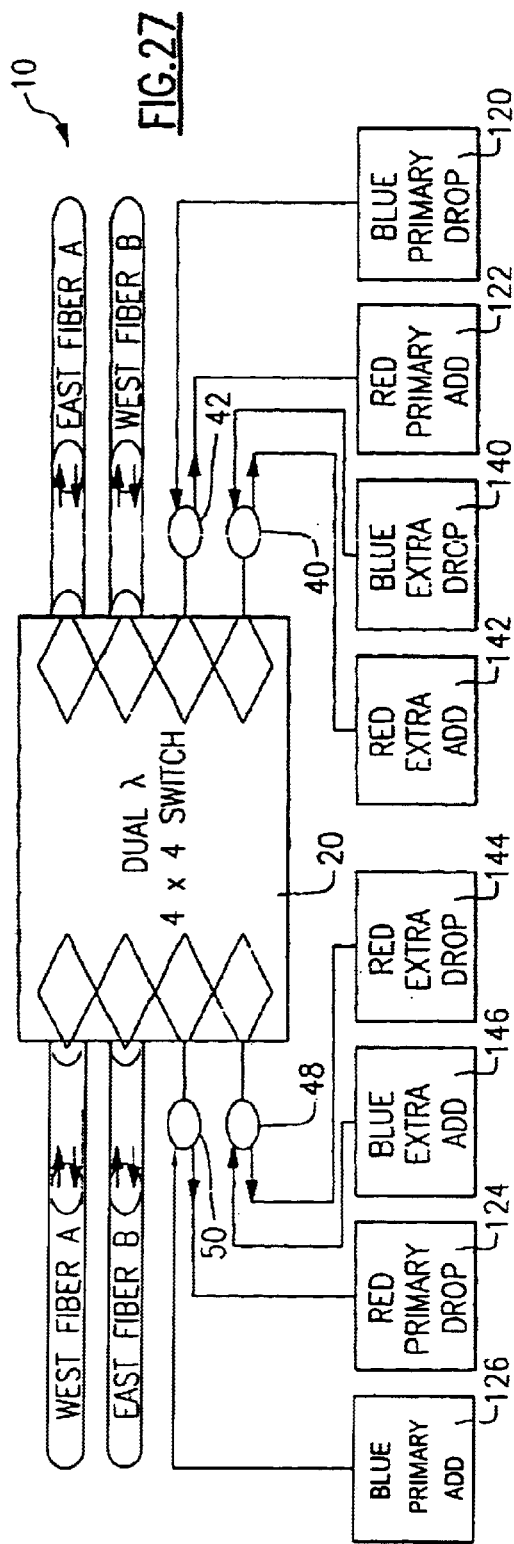
FIG. 27 is a block diagram of the protection switch in accordance with a second embodiment of the present invention.

Referring to FIG. 24, a functional block diagram of 4×4 optical protection switch 20 in a primary traffic and extra traffic add/drop mode is disclosed. For this to work, the red and blue wavelength signals must complement each other. For example, switch state sixteen (16) drops the protection blue wavelength from the east and adds the primary traffic to the working blue wavelength to the east. On the other hand, the working red wavelength from the east is dropped to the primary red client, and extra client traffic is added to the working red wavelength to the west. The seventeenth (17) switch state reverses the roles of the red and blue wavelength signals vis a vis the sixteenth switch state. All in all, this mode includes nine switching states (16–24), which are shown in detail in FIG. 24. FIG. 25 is a functional block diagram of a 4×4 optical protection switch in a "east" failure mode is disclosed. In this mode, the 4×4 switch includes six switch states (25–30) as shown. FIG. 26 is a functional block diagram of a 4×4 optical protection switch in a "west" failure mode. The 4×4 switch includes six switch states (25–30) in this mode as well As embodied herein and depicted in FIG. 27, a block diagram of a protection switch in accordance with a second embodiment of the present invention is disclosed. This embodiment represents a variation of the configuration shown in FIG. 2. FIG. 27 represents a one bi-directional channel system. The ring is small enough such that amplification is not needed. In this scenario, the multiplexers, demultiplexers, and half of the three-port interleaving devices are not needed.

Figure 28:
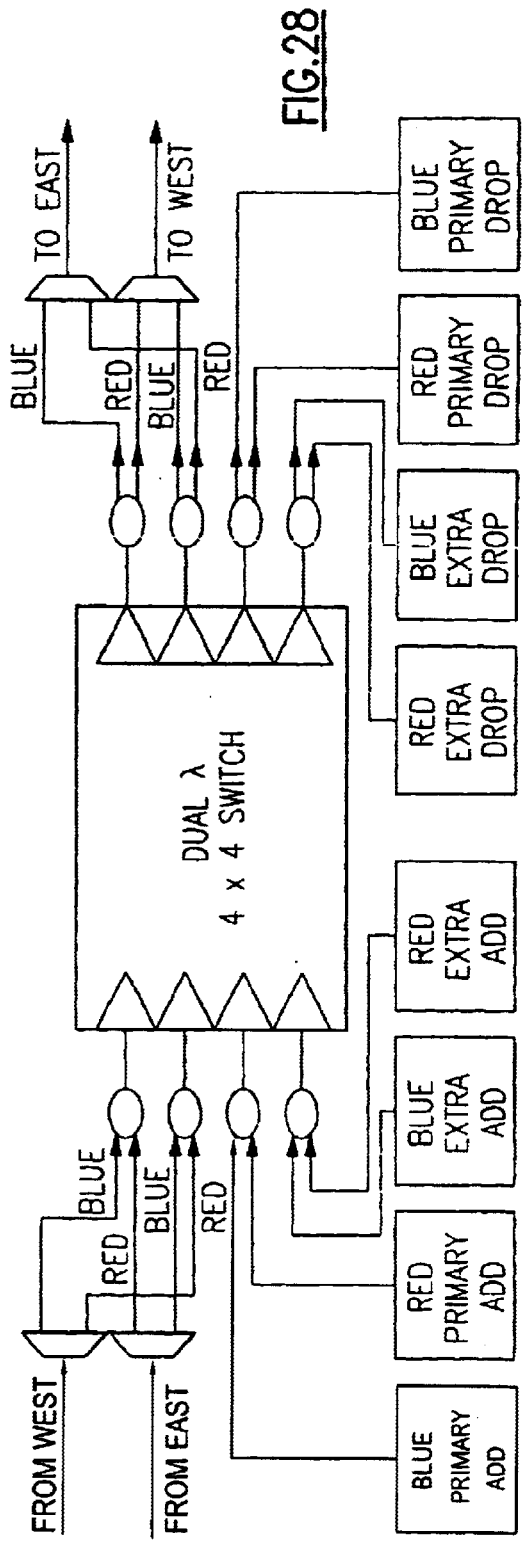
FIG. 28 is a block diagram of the protection switch in accordance with a third embodiment of the present invention.

Referring to FIG. 28, a block diagram of a protection switch in accordance with a third embodiment of the present invention is disclosed. In this variation, all of the components are identical to FIG. 2, the difference is that both wavelengths in the bi-directional channel are allowed to propagate through the switch in the same direction. Thus, a path through the switch accommodates both wavelength signals. For example, if the switch is actuated such that red primary traffic is being added, blue primary traffic will be added as well. The only way to avoid this is by disabling the laser. The above description is true of drop traffic. If primary red is dropped, primary blue will also be dropped. The way to avoid dropping one of the colors is for the color not to be present in the fiber. Those of ordinary skill will recognize that the embodiment depicted in FIG. 28 generalizes to more than one bi-directional channel (e.g., one pair of wavelength signals). The switch is well suited to manage a band of 4 or more wavelengths as a group. Thus, this embodiment is useful when tow or more wavelengths in a specific band are always added or dropped together. Those of ordinary skill will also recognize that the isolation between wavelength signals in a channel is not quite as high in this embodiment, as compared to the embodiment shown in FIG. 2.

It will be apparent to those of ordinary skill in the pertinent art that three-port optical devices (40, . . . , 54) may be of any suitable type including an optical interleaver device, an optical splitter, or an optical circulator. Each of these devices includes a bi-directional input supporting both wavelength signals in the bi-directional channel and two input ports, for receiving each of the wavelength signals.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A protection switch for use in a node of a two-fiber optical shared protection ring, the two-fiber optical shared protection ring propagating at least one bi-directional channel, each bi-directional channel including a working first wavelength signal and a working second wavelength signal, one fiber in the two-fiber optical channel shared protection ring propagating the working first wavelength signal in a first direction and the other fiber in the two-fiber optical channel shared protection ring propagating the working second wavelength signal in a second direction opposite the first direction, the switch comprising:

an N×N optical switch fabric system disposed in the node, the N×N optical switch fabric including 2N input/output (I/O) ports, each optical switch fabric being configured to switch at least one bi-directional channel, wherein N is four, or an integer multiple of four;

at least N three-port optical devices coupled to N I/O ports, each three-port optical device includes a bi-directional port coupled to one I/O port, the bi-directional port being configured to propagate the at least one bi-directional channel.

2. The switch of claim 1, further comprising:

at least one drop port coupled to an output port of at least one three-port optical device; and at least one add port coupled to an input port of at least one three-port optical device.

3. The switch of claim 1, wherein the bi-directional N×N optical switch fabric system is an N×N space-division optical switch.

4. The switch of claim 1, further comprising:

a first fiber optical multiplexer coupled to each output port of N/2 three-port optical devices, the first fiber optical multiplexer being configured to multiplex the working first wavelength signal and the protection second wavelength signal for each bi-directional channel propagating in the node;

a first fiber optical demultiplexer coupled to each input port of N/2 three-port optical devices, the optical multiplexer being configured to demultiplex the DWDM signal into the working first wavelength signal and the protection second wavelength signal for each bi-directional channel propagating in the node;

a second fiber optical multiplexer coupled to each output port of N/2 three-port optical devices, the second fiber optical multiplexer being configured to multiplex the working second wavelength signal and the protection first wavelength signal for each bi-directional channel propagating in the node; and a second fiber optical demultiplexer coupled to each input port of the N/2 three-port optical devices, the optical multiplexer being configured to demultiplex the DWDM signal into the working second wavelength signal and the protection first wavelength signal for each bi-directional channels propagating in the node.

5. The switch of claim 4, wherein each of the first fiber optical multiplexer, first fiber optical demultiplexer, the second fiber optical multiplexer, and the second fiber optical demultiplexer are comprised of a diffraction grating system.

6. The switch of claim 1, wherein the at least N three-port optical devices includes 2N three-port optical devices coupled to 2N I/O ports.

7. The switch of claim 1, wherein the N×N optical switch fabric system includes at least one 4×4 bi-directional switch fabric configured to switch one bi-directional channel having a working first wavelength signal and a working second wavelength signal, the switch fabric being configured to propagate the working first wavelength signal in a first switch direction, and propagate the working second wavelength signal in a second switch direction opposite to the first switch direction, the at least one 4×4 bi-directional switch fabric including eight-I/O ports.

8. The switch of claim 7, wherein the eight-I/O ports are coupled to eight three-port optical devices.

9. The switch of claim 8, wherein the eight three-port optical devices are optical interleaving devices having a bi-directional port, an input port, and an output port.

10. The switch of claim 9, wherein each bi-directional channel includes a protection first wavelength signal propagating in the second switch direction and a protection second wavelength signal propagating in the first switch direction.

11. The switch of claim 10, wherein an optical interleaving device includes an input coupled to a working first wavelength add port and an output coupled to a working second wavelength drop port.

12. The switch of claim 10, wherein an optical interleaving device includes an input coupled to a working second wavelength add port and an output coupled to a working first wavelength drop port.

13. The switch of claim 10, wherein an optical interleaving device includes an input coupled to a protection first wavelength add port and an output coupled to a protection second wavelength drop port.

14. The switch of claim 10, wherein an optical interleaving device includes an input coupled to a protection second wavelength add port and an output coupled to a protection first wavelength drop port.

15. The switch of claim 10, wherein each of a plurality of optical interleaving devices include an output port coupled to an optical multiplexer.

16. The switch of claim 10, wherein each of a plurality of optical interleaving devices include an input port coupled to an optical demultiplexer.

17. The switch of claim 10, wherein the at least one 4×4 bi-directional switch fabric includes a bar switch state such that the working first wavelength signal and the working second wavelength signal are not switched, and traverse an identical path through the switch in opposite directions.

18. The switch of claim 10, wherein the at least one 4×4 bi-directional switch fabric includes a bar switch state such that the protection first wavelength signal and the protection second wavelength signal are not switched, and traverse an identical path through the switch in opposite directions.

19. The switch of claim 10, wherein the at least one 4×4 bi-directional switch fabric includes a cross switch state for dropping at least one working wavelength signal of the bi-directional channel.

20. The switch of claim 10, wherein the at least one 4×4 bi-directional switch fabric includes a cross switch state for adding at least one working wavelength signal to the bi-directional channel.

21. The switch of claim 10, wherein the at least one 4×4 bi-directional switch fabric includes a cross switch state for dropping at least one protection wavelength signal from the bi-directional channel.

22. The switch of claim 10, wherein the at least one 4×4 bi-directional switch fabric includes a cross switch state for adding at least one protection wavelength signal to the bi-directional channel.

23. The switch of claim 22, wherein the two-fiber optical shared protection ring accommodates one bi-directional channel.

24. The switch of claim 10, wherein the at least one 4×4 bi-directional switch fabric includes a cross switch state for dropping at least one protection wavelength signal from the bi-directional channel.

25. The switch of claim 10, wherein the at least one 4×4 bi-directional switch fabric includes a cross switch state for adding both at least one working wavelength signal and at least one protection wavelength signal to the bi-directional channel.

26. The switch of claim 7, wherein the eight-I/O ports are coupled to four three-port optical devices.

27. The switch of claim 26, wherein the four three-port optical devices are optical interleaving devices having a bi-directional port, an input port, and an output port.

28. The switch of claim 7, wherein the at least one 4×4 bi-directional switch fabric is comprised of a 4×4 space-division optical switch.

29. The switch of claim 7, wherein the at least one 4×4 bi-directional switch fabric comprises a thermooptic silica actuated switch.

30. The switch of claim 7, wherein the at least one 4×4 bi-directional switch fabric is comprised of a 4×4 space-division optical switch including Mach-Zehnder interferometer switching units.

31. The switch of claim 30, wherein the Mach-Zehnder interferometer switching units include thermooptic actuators.

32. The switch of claim 30, wherein the Mach-Zehnder interferometer switching units include electrooptic actuators.

33. The switch of claim 30, wherein the Mach-Zehnder interferometer switching units include piezoelectric actuators.

34. The switch of claim 7, wherein the at least one 4×4 bi-directional switch fabric is comprised of a 4×4 MEMS optical switch.

35. The switch of claim 1, wherein the N×N optical switch fabric system includes at least one 4×4 uni-directional switch fabric configured to switch one bi-directional channel having a working first wavelength signal and a working second wavelength signal, the switch fabric being configured to propagate the working first wavelength signal and the working second wavelength signal in a first switch direction, the at least one 4×4 bi-directional switch fabric including eight-I/O ports, each I/O port being coupled to a three-port optical band-splitter.

36. The switch of claim 35, wherein the working first wavelength signal and the working second wavelength signal of the bi-directional channel are not independently switchable.

37. The switch of claim 35, wherein each bi-directional channel includes a protection first wavelength signal and a protection second wavelength signal propagating in the first switch direction.

38. The switch of claim 37, wherein the working first wavelength signal, the protection first wavelength signal, the working second wavelength signal, and the protection second wavelength signal of the bi-directional channel are not independently switchable.

39. A two-fiber optical channel shared protection ring, the two-fiber optical shared protection ring propagating at least one bi-directional channel, each bi-directional channel including a working first wavelength signal and a working second wavelength signal, one fiber in the two-fiber optical channel shared protection ring propagating the working first wavelength signal in a first direction and the other fiber in the two-fiber optical channel shared protection ring propagating the working second wavelength signal in a second direction opposite the first direction, the protection ring comprising:

a monitor coupled to the two-fiber optical channel shared protection ring, the monitor being configured to detect at least one fault condition in the two-fiber optical channel shared protection ring; and a plurality of switching nodes interconnected by the two-fiber optical channel shared protection ring, each switching node being responsive to the monitor, the switching node including, an N×N optical switch fabric system disposed in the node, the N×N optical switch fabric including 2N input/output (I/O) ports, each optical switch fabric being configured to switch at least one bi-directional channel, wherein N is four, or an integer multiple of four, at least N three-port optical devices coupled to at least N I/O ports, each three-port optical device includes a bi-directional port coupled to one I/O port, an input port, and an output port, the bi-directional port being configured to propagate the at least one bi-directional channel, at least one client add port coupled to the input port, and at least one drop port coupled to the output port.

40. The protection ring of claim 39, wherein the at least N three-port optical devices includes 2N three-port optical devices coupled to 2N I/O ports.

41. The protection ring of claim 39, wherein the N×N optical switch fabric system includes at least one 4×4 bi-directional switch fabric configured to switch one bi-directional channel having a working first wavelength signal and a working second wavelength signal, the switch fabric being configured to propagate the working first wavelength signal in a first switch direction, and propagate the working second wavelength signal in a second switch direction opposite to the first switch direction, the at least one 4×4 bi-directional switch fabric including eight-I/O ports.

42. The protection ring of claim 39, wherein at least one of the plurality of switching nodes is actuated in response to the at least one fault condition.

\* \* \* \* \*